(12) United States Patent
Gao

(10) Patent No.: US 11,700,608 B2
(45) Date of Patent: Jul. 11, 2023

(54) UPLINK CONTROL INFORMATION TRANSMISSION METHOD, UPLINK CONTROL INFORMATION RECEPTION METHOD, TERMINAL, BASE STATION AND DEVICES

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/977,017

(22) PCT Filed: Mar. 1, 2019

(86) PCT No.: PCT/CN2019/076678
§ 371 (c)(1),
(2) Date: Aug. 31, 2020

(87) PCT Pub. No.: WO2019/166010
PCT Pub. Date: Sep. 6, 2019

(65) Prior Publication Data
US 2021/0392637 A1    Dec. 16, 2021

(30) Foreign Application Priority Data
Mar. 1, 2018  (CN) .......................... 201810172419.3

(51) Int. Cl.
*H04W 72/04*   (2009.01)
*H04W 72/21*   (2023.01)
(Continued)

(52) U.S. Cl.
CPC .......... *H04W 72/21* (2023.01); *H04L 1/1819* (2013.01); *H04L 1/1896* (2013.01);
(Continued)

(58) Field of Classification Search
None
See application file for complete search history.

(56) References Cited

U.S. PATENT DOCUMENTS 11,387,850 B2 *  7/2022  Chahal ..................... H04B 7/22
11,483,836 B2 * 10/2022  Zhang ...................... H04B 7/22
(Continued)

FOREIGN PATENT DOCUMENTS

CN        105379161 A        3/2016
CN        107666718 A        2/2018
(Continued)

OTHER PUBLICATIONS

International Search Report from PCT/CN2019/076678, dated Apr. 29, 2019, with English translation from WIPO.
(Continued)

*Primary Examiner* — Brandon M Renner
(74) *Attorney, Agent, or Firm* — Ladas & Parry, LLP

(57) ABSTRACT

A UCI transmission method, a UCI reception method, a terminal, a base station and devices are provided. The UCI transmission method includes: determining a first transmission resource for first UCI and second transmission resources for second UCI; and when the first transmission resource overlaps at least two second transmission resources in a time domain, transmitting the first UCI and the second UCI simultaneously on at least one of the at least two second transmission resources.

20 Claims, 8 Drawing Sheets

(51) Int. Cl.
  *H04L 1/1812* (2023.01)
  *H04L 1/1867* (2023.01)
  *H04W 72/0446* (2023.01)
  *H04W 72/1263* (2023.01)
  *H04W 72/54* (2023.01)

(52) U.S. Cl.
  CPC ... *H04W 72/0446* (2013.01); *H04W 72/1263* (2013.01); *H04W 72/54* (2023.01)

(56) References Cited

U.S. PATENT DOCUMENTS

| | | | |
|---|---|---|---|
| 2012/0106472 | A1 | 5/2012 | Rosa et al. |
| 2015/0085787 | A1* | 3/2015 | Ouchi .................. H04L 5/0094 370/329 |
| 2015/0223235 | A1 | 8/2015 | Hwang et al. |
| 2016/0295575 | A1* | 10/2016 | Dinan .................. H04L 5/0057 |
| 2018/0375619 | A1 | 12/2018 | Hwang et al. |
| 2019/0268089 | A1* | 8/2019 | Fu .......................... H04L 5/0051 |
| 2021/0022129 | A1* | 1/2021 | Yuan ..................... H04W 72/04 |

FOREIGN PATENT DOCUMENTS

| | | |
|---|---|---|
| EP | 3094026 A1 | 11/2016 |
| WO | 2011077743 A1 | 6/2011 |
| WO | 2014051254 A1 | 4/2014 |
| WO | 2017105158 A1 | 6/2017 |

OTHER PUBLICATIONS

Written Opinion of the International Searching Authority from PCT/CN2019/076678, dated Apr. 29, 2019, with English translation from WIPO.
International Preliminary Report on Patentability from PCT/CN2019/076678, dated Sep. 1, 2020, with English translation from WIPO.
"Remaining issues for long PUCCH", R1-1800490, 3GPP TSG RAN WG1 Meeting AH 1801, Vancouver, Canada, Jan. 22-26, 2018.
"Handling of PUCCH transmission with partial overlap", R1-1802690, 3GPP TSG RAN WG1 Meeting #92, Athens, Greece, Feb. 26-Mar. 2, 2018.
Extended European Search Report from EP app. No. 19760070.3, dated Feb. 9, 2021.
First Office Action from TW app. No. 108106672, dated Dec. 24, 2020, with machine English translation.
First Search from CN App. No. 201810172419, dated Sep. 25, 2020, mailed Oct. 10, 2020.
First Office Action from CN App. No. 201810172419, dated Oct. 10, 2020, with machine English translation.
Supplementary Search from CN App. No. 201810172419, dated Apr. 17, 2021, mailed on Apr. 26, 2021.
Second Office Action from CN App. No. 201810172419, dated Apr. 26, 2021, with machine English translation.
Notification to Grant Patent Right for Invention from CN App. No. 201810172419, dated Jan. 11, 2022.
Communication Pursuant to Article 94(3) EPC from EP Appl. No. 19760070, dated Nov. 4, 2021.
First Office Action from KR App. No. 10-2020-7026019, dated Feb. 3, 2022, with machine English translation.
Ericsson, R1-1801262, summary of Discussions on Multiplexing Different UCI types on a PUCCH resource, 3GPP server publication date (Jan. 22, 2018), entire document.

* cited by examiner

UPLINK CONTROL INFORMATION TRANSMISSION METHOD, UPLINK CONTROL INFORMATION RECEPTION METHOD, TERMINAL, BASE STATION AND DEVICES

CROSS-REFERENCE TO RELATED APPLICATIONS

The present application is the U.S. national phase of PCT Application No. PCT/CN2019/076678 filed on Mar. 1, 2019, which claims a priority to the Chinese patent application No. 201810172419.3 filed on Mar. 1, 2018, the disclosures of which are incorporated herein by reference in their entireties.

TECHNICAL FIELD

The present disclosure relates to the field of communication technology, in particular to an uplink control information transmission method, an uplink control information reception method, a terminal, a base station and devices.

BACKGROUND

In a New Radio Access Technology (RAT) (NR) system, totally five NR Physical Uplink Control Channel (PUCCH) formats, i.e., format 0, format 1, format 2, format 3 and format 4, have been defined. The PUCCH formats 0 and 1 are used for the transmission of Uplink Control Information (UCI) having one or two bits, and the PUCCH formats 2, 3 and 4 are used for the transmission of the UCI having more than two bits. The PUCCH formats 0 and 2 are short PUCCHs and occupy one to two symbols for the transmission; and the PUCCH formats 1, 3 and 4 are long PUCCHs and occupy four to fourteen symbols for the transmission.

A Scheduling Request (SR) is transmitted using the PUCCH format 0 or 1. A transmission periodicity and an offset of the SR are pre-configured through high-layer signaling, and a transmission opportunity of the SR is determined in accordance with the transmission periodicity and the offset. In the transmission opportunity of the SR, when there is a positive SR, one PUCCH format is pre-configured through the high-layer signaling for the SR, so as to transmit the SR; and when there is a negative SR, the SR is not transmitted.

A Hybrid Automatic Repeat Request-Acknowledgement (HARQ-ACK) is transmitted using any one of the five formats. When the HARQ-ACK has one or two bits, it is transmitted using the PUCCH format 0 or 1. When the HARQ-ACK has more than two bits, one PUCCH resource set is selected from a plurality of PUCCH resource sets pre-configured for a terminal in accordance with the quantity of bits, and each PUCCH resource set corresponds to one range of the quantity of bits. One PUCCH resource is selected from the selected PUCCH resource set in accordance with an HARQ-ACK resource indication field in a Downlink Control Information (DCI) format used by a Physical Downlink Control Channel (PDCCH) corresponding to the HARQ-ACK, and then the HARQ-ACK is transmitted on the selected PUCCH resource.

Periodic Channel State Information (CSI) is transmitted using the PUCCH format 2, 3 or 4. To-be-transmitted periodic CSI is subjected to channel encoding and rate matching, and then mapped to a PUCCH resource other than a pilot resource for transmission.

In a word, along with the development of the requirements on mobile communication services, such organizations as International Telecommunication Union (ITU) and $3^{rd}$-Generation Partnership Project (3GPP) have started to research a new wireless communication system (e.g., $5^{th}$-Generation (5G) NR). In a current 5G NR system, the HARQ-ACK is transmitted using the NR PUCCH format 0, 1, 2, 3 of 4, the SR is transmitted using the NR PUCCH format 0 or 1, and the periodic CSI is transmitted using the NR PUCCH format 2, 3 or 4. In the NR system, relevant parameters of the PUCCHs for different UCI are configured separately, and the transmission resources for different UCI and the used PUCCH formats are configured separately. As shown in FIG. 1, when a relatively large quantity of symbols is occupied for the transmission of one kind of UCI on the PUCCH, another kind of UCI may probably be transmitted multiple times within a range of a transmission time domain of the UCI. Merely one PUCCH is capable of being transmitted by the UE at one uplink time point on one carrier, and at this time, there is no definite method for transmitting the UCI.

SUMMARY

An object of the present disclosure is to provide a UCI transmission method, a UCI reception method, a terminal, a base station and devices, so as to provide a definite method for the transmission of the UCI when the transmission resources for different UCI overlap each other in the time domain.

In one aspect, the present disclosure provides in some embodiments a UCI transmission method, including: determining a first transmission resource for first UCI and second transmission resources for second UCI; and when the first transmission resource overlaps at least two second transmission resources in a time domain, transmitting the first UCI and the second UCI simultaneously on at least one of the at least two second transmission resources.

In a possible embodiment of the present disclosure, prior to transmitting the first UCI and the second UCI simultaneously on the at least one of the at least two second transmission resources, the UCI transmission method further includes determining that the first UCI and the second UCI are to be transmitted simultaneously.

In a possible embodiment of the present disclosure, the first UCI is HARQ-ACK, CSI or an SR, and the second UCI is HARQ-ACK, CSI or an SR.

In a possible embodiment of the present disclosure, the transmitting the first UCI and the second UCI simultaneously on the at least one of the at least two second transmission resources includes: transmitting the first UCI and the second UCI simultaneously on each of the at least two second transmission resources; or transmitting the first UCI and the second UCI simultaneously on a predetermined second transmission resource of the at least two second transmission resources.

In a possible embodiment of the present disclosure, the transmitting the first UCI and the second UCI simultaneously on the at least one of the at least two second transmission resources includes, when the first UCI is an SR or CSI and the second UCI is HARQ-ACK, transmitting the first UCI and the second UCI simultaneously on each of the at least two second transmission resources.

In a possible embodiment of the present disclosure, the transmitting the first UCI and the second UCI simultaneously on the at least one of the at least two second transmission resources includes, when the first UCI is a positive SR and the second UCI is HARQ-ACK, transmitting the first UCI and the second UCI simultaneously on each of the at least two second transmission resources, or transmitting the first UCI and the second UCI simultaneously on a predetermined second transmission resource of the at least two second transmission resources.

In a possible embodiment of the present disclosure, the transmitting the first UCI and the second UCI simultaneously on the at least one of the at least two second transmission resources includes, when the first UCI is HARQ-ACK or an SR and the second UCI is CSI, transmitting the first UCI and the second UCI simultaneously on each of the at least two second transmission resources, or transmitting the first UCI and the second UCI simultaneously on a predetermined second transmission resource of the at least two second transmission resources.

In a possible embodiment of the present disclosure, the transmitting the first UCI and the second UCI simultaneously on the at least one of the at least two second transmission resources includes, when the first UCI is an SR, one of second UCI transmitted on at least one of the at least two second transmission resources is CSI, and another of second UCI transmitted on at least one of the at least two second transmission resources is HARQ-ACK, transmitting the first UCI and the second UCI simultaneously on each of the at least two second transmission resources, or transmitting the first UCI and the second UCI simultaneously on a predetermined second transmission resource of the at least two second transmission resources.

In a possible embodiment of the present disclosure, the transmitting the first UCI and the second UCI simultaneously on the at least one of the at least two second transmission resources includes, when the first UCI is HARQ-ACK and the second UCI is an SR or a positive SR, transmitting the first UCI and the second UCI simultaneously on each of the at least two second transmission resources, or transmitting the first UCI and the second UCI simultaneously on a predetermined second transmission resource of the at least two second transmission resources.

In a possible embodiment of the present disclosure, the first UCI is transmitted with a PUCCH format for carrying a small quantity of bits.

In a possible embodiment of the present disclosure, the first UCI is transmitted with a PUCCH format for carrying a large quantity of bits.

In a possible embodiment of the present disclosure, the second UCI is transmitted with a PUCCH format for carrying a small quantity of bits.

In a possible embodiment of the present disclosure, the second UCI is transmitted with a PUCCH format for carrying a large quantity of bits.

In a possible embodiment of the present disclosure, the predetermined second transmission resource is determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission.

In another aspect, the present disclosure provides in some embodiments a UCI reception method, including: determining a first transmission resource for first UCI and second transmission resources for second UCI; and when the first transmission resource overlaps at least two second transmission resources in a time domain, receiving the first UCI and the second UCI simultaneously on at least one of the at least two second transmission resources.

In a possible embodiment of the present disclosure, prior to receiving the first UCI and the second UCI simultaneously on the at least one of the at least two second transmission resources, the UCI reception method further includes determining that the first UCI and the second UCI are transmitted simultaneously.

In a possible embodiment of the present disclosure, the first UCI is HARQ-ACK, CSI or an SR, and the second UCI is HARQ-ACK, CSI or an SR.

In a possible embodiment of the present disclosure, the receiving the first UCI and the second UCI simultaneously on the at least one of the at least two second transmission resources includes: receiving the first UCI and the second UCI simultaneously on each of the at least two second transmission resources; or receiving the first UCI and the second UCI simultaneously on a predetermined second transmission resource of the at least two second transmission resources.

In a possible embodiment of the present disclosure, the receiving the first UCI and the second UCI simultaneously on the at least one of the at least two second transmission resources includes, when the first UCI is an SR or CSI and the second UCI is HARQ-ACK, receiving the first UCI and the second UCI simultaneously on each of the at least two second transmission resources.

In a possible embodiment of the present disclosure, the receiving the first UCI and the second UCI simultaneously on the at least one of the at least two second transmission resources includes, when the first UCI is a positive SR and the second UCI is HARQ-ACK, receiving the first UCI and the second UCI simultaneously on each of the at least two second transmission resources, or receiving the first UCI and the second UCI simultaneously on a predetermined second transmission resource of the at least two second transmission resources.

In a possible embodiment of the present disclosure, the receiving the first UCI and the second UCI simultaneously on the at least one of the at least two second transmission resources includes, when the first UCI is HARQ-ACK or an SR and the second UCI is CSI, receiving the first UCI and the second UCI simultaneously on each of the at least two second transmission resources, or receiving the first UCI and the second UCI simultaneously on a predetermined second transmission resource of the at least two second transmission resources.

In a possible embodiment of the present disclosure, the receiving the first UCI and the second UCI simultaneously on the at least one of the at least two second transmission resources includes, when the first UCI is an SR, one second UCI transmitted on at least one of the at least two second transmission resources is CSI, and another second UCI transmitted on at least one of the at least two second transmission resources is HARQ-ACK, receiving the first UCI and the second UCI simultaneously on each of the at least two second transmission resources, or receiving the first UCI and the second UCI simultaneously on a predetermined second transmission resource of the at least two second transmission resources.

In a possible embodiment of the present disclosure, the receiving the first UCI and the second UCI simultaneously on the at least one of the at least two second transmission resources includes, when the first UCI is HARQ-ACK and the second UCI is an SR or a positive SR, receiving the first UCI and the second UCI simultaneously on each of the at least two second transmission resources, or receiving the first UCI and the second UCI simultaneously on a predetermined second transmission resource of the at least two second transmission resources.

In a possible embodiment of the present disclosure, the first UCI is transmitted with a PUCCH format for carrying a small quantity of bits.

In a possible embodiment of the present disclosure, the first UCI is transmitted with a PUCCH format for carrying a large quantity of bits.

In a possible embodiment of the present disclosure, the second UCI is transmitted with a PUCCH format for carrying a small quantity of bits.

In a possible embodiment of the present disclosure, the second UCI is transmitted with a PUCCH format for carrying a large quantity of bits.

In a possible embodiment of the present disclosure, the predetermined second transmission resource is determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for the periodic transmission of the second UCI.

In yet another aspect, the present disclosure provides in some embodiments a terminal, including a transceiver, a memory, a processor, and a computer program stored in the memory and executed by the processor. The processor is configured to read the computer program so as to determine a first transmission resource for first UCI and second transmission resources for second UCI. The transceiver is configured to, when the first transmission resource overlaps at least two second transmission resources in a time domain, transmit the first UCI and the second UCI simultaneously on at least one of the at least two second transmission resources.

In a possible embodiment of the present disclosure, the processor is further configured to determine that the first UCI and the second UCI are to be transmitted simultaneously.

In a possible embodiment of the present disclosure, the first UCI is HARQ-ACK, CSI or an SR, and the second UCI is HARQ-ACK, CSI or an SR.

In a possible embodiment of the present disclosure, the transceiver is further configured to: transmit the first UCI and the second UCI simultaneously on each of the at least two second transmission resources; or transmit the first UCI and the second UCI simultaneously on a predetermined second transmission resource of the at least two second transmission resources.

In a possible embodiment of the present disclosure, the transceiver is further configured to, when the first UCI is an SR or CSI and the second UCI is HARQ-ACK, transmit the first UCI and the second UCI simultaneously on each of the at least two second transmission resources.

In a possible embodiment of the present disclosure, the transceiver is further configured to, when the first UCI is a positive SR and the second UCI is HARQ-ACK, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transceiver is further configured to, when the first UCI is HARQ-ACK or an SR and the second UCI is CSI, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transceiver is further configured to, when the first UCI is an SR, one second UCI transmitted on at least one of the at least two second transmission resources is CSI, and another second UCI transmitted on at least one of the at least two second transmission resources is HARQ-ACK, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transceiver is further configured to, when the first UCI is HARQ-ACK and the second UCI is an SR or a positive SR, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the first UCI is transmitted with a PUCCH format for carrying a small quantity of bits.

In a possible embodiment of the present disclosure, the first UCI is transmitted with a PUCCH format for carrying a large quantity of bits.

In a possible embodiment of the present disclosure, the second UCI is transmitted with a PUCCH format for carrying a small quantity of bits.

In a possible embodiment of the present disclosure, the second UCI is transmitted with a PUCCH format for carrying a large quantity of bits.

In a possible embodiment of the present disclosure, the predetermined second transmission resource is determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission.

In still yet another aspect, the present disclosure provides in some embodiments a UCI transmission device, including: a first resource determination module configured to determine a first transmission resource for first UCI and second transmission resources for second UCI; and a transmission module configured to, when the first transmission resource overlaps at least two second transmission resources in a time domain, transmit the first UCI and the second UCI simultaneously on at least one of the at least two second transmission resources.

In still yet another aspect, the present disclosure provides in some embodiments a computer-readable storage medium storing therein a computer program. The computer program is executed by a processor so as to implement the above-mentioned UCI transmission method.

In still yet another aspect, the present disclosure provides in some embodiments a base station, including a transceiver, a memory, a processor, and a computer program stored in the memory and executed by the processor. The processor is configured to read the computer program in the memory, so as to determine a first transmission resource for first UCI and second transmission resources for second UCI, and the transceiver is configured to, when the first transmission resource overlaps at least two second transmission resources in a time domain, receive the first UCI and the second UCI simultaneously on at least one of the at least two second transmission resources.

In a possible embodiment of the present disclosure, the processor is further configured to determine that the first UCI and the second UCI are transmitted simultaneously.

In a possible embodiment of the present disclosure, the first UCI is HARQ-ACK, CSI or an SR, and the second UCI is HARQ-ACK, CSI or an SR.

In a possible embodiment of the present disclosure, the transceiver is further configured to: receive the first UCI and the second UCI simultaneously on each of the at least two second transmission resources; or receive the first UCI and the second UCI simultaneously on a predetermined second transmission resource of the at least two second transmission resources.

In a possible embodiment of the present disclosure, the transceiver is further configured to, when the first UCI is an SR or CSI and the second UCI is HARQ-ACK, receive the first UCI and the second UCI simultaneously on each of the at least two second transmission resources.

In a possible embodiment of the present disclosure, the transceiver is further configured to, when the first UCI is a positive SR and the second UCI is HARQ-ACK, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the transceiver is further configured to, when the first UCI is HARQ-ACK or an SR and the second UCI is CSI, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the transceiver is further configured to, when the first UCI is an SR, one second UCI transmitted on at least one of the at least two second transmission resources is CSI, and another second UCI transmitted on at least one of the at least two second transmission resources is HARQ-ACK, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the transceiver is further configured to, when the first UCI is HARQ-ACK and the second UCI is an SR or a positive SR, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the first UCI is transmitted with a PUCCH format for carrying a small quantity of bits.

In a possible embodiment of the present disclosure, the first UCI is transmitted with a PUCCH format for carrying a large quantity of bits.

In a possible embodiment of the present disclosure, the second UCI is transmitted with a PUCCH format for carrying a small quantity of bits.

In a possible embodiment of the present disclosure, the second UCI is transmitted with a PUCCH format for carrying a large quantity of bits.

In a possible embodiment of the present disclosure, the predetermined second transmission resource is determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission.

In still yet another aspect, the present disclosure provides in some embodiments a UCI reception device, including: a second resource determination module configured to determine a first transmission resource for first UCI and second transmission resources for second UCI; and a reception module configured to, when the first transmission resource overlaps at least two second transmission resources in a time domain, receive the first UCI and the second UCI simultaneously on at least one of the at least two second transmission resources.

In still yet another aspect, the present disclosure provides in some embodiments a computer-readable storage medium storing therein a computer program. The computer program is executed by a processor so as to implement the above-mentioned UCI reception method.

The present disclosure at least has the following beneficial effects. According to the UCI transmission method, the UCI reception method, the terminal, the base station and the devices in the embodiments of the present disclosure, when the first transmission resource overlaps at least two second transmission resources in the time domain, the first UCI and the second UCI may be transmitted simultaneously on at least one of the at least two second transmission resources. As a result, it is able to provide a definite method for transmitting the UCI, thereby to enable a system to operate normally.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
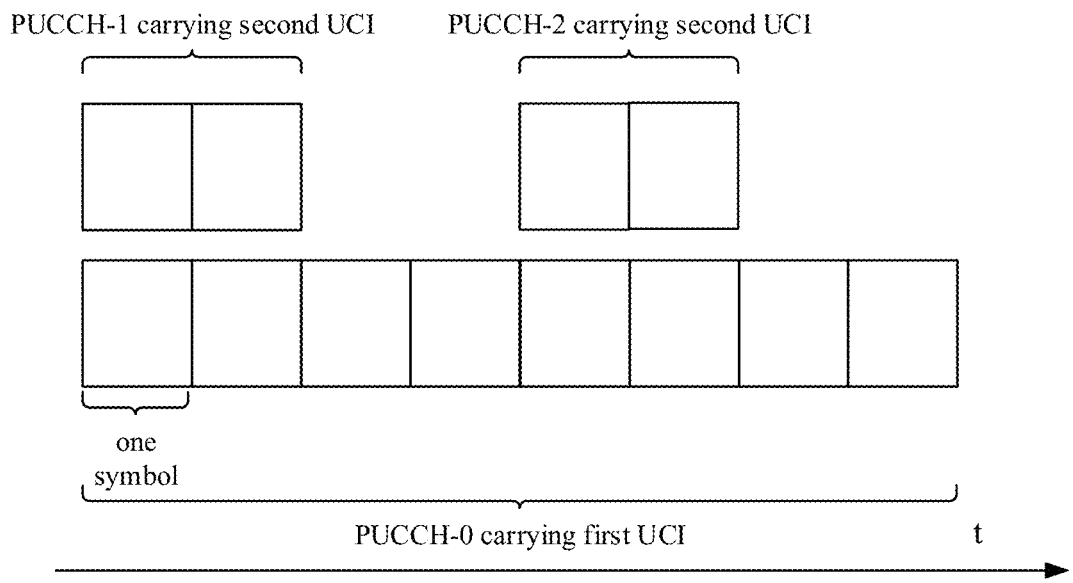
FIG. 1 is a schematic view showing a principle for the transmission of a plurality of UCI in the related art.
Figure 2:
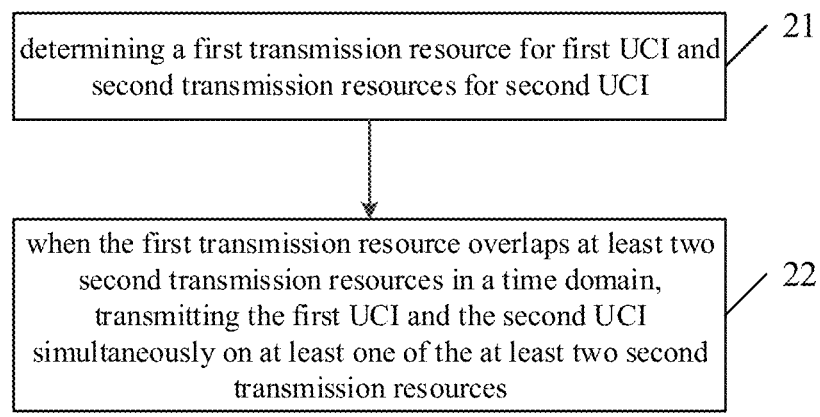
FIG. 2 is a flow chart of a UCI transmission method according to one embodiment of the present disclosure.

As shown in FIG. 2, the present disclosure provides in some embodiments a UCI transmission method, which includes the following steps.

Step 21: determining a first transmission resource for first UCI and second transmission resources for second UCI.

In this step, the first UCI may be HARQ-ACK, CSI or an SR, and the second UCI may be HARQ-ACK, CSI or an SR.

Step 22: when the first transmission resource overlaps at least two second transmission resources in a time domain, transmitting the first UCI and the second UCI simultaneously on at least one of the at least two second transmission resources. To be specific, Step 22 may include transmitting the first UCI and the second UCI simultaneously on each of the at least two second transmission resources, or transmitting the first UCI and the second UCI simultaneously on a predetermined second transmission resource of the at least two second transmission resources.

In a possible embodiment of the present disclosure, a large quantity of symbols may be occupied by the first transmission resource. For example, when the first transmission resource is a PUCCH resource, a corresponding PUCCH may be a long PUCCH occupying four to fourteen symbols. Because the first transmission resource overlaps the at least two second transmission resources in the time domain, a small quantity of symbols may be occupied by each second transmission resource. For example, when the second transmission resource is a PUCCH resource, a corresponding PUCCH may a short PUCCH occupying one or two symbols. Of course, the first transmission resource and the second transmission resources may each be a transmission resource for a long PUCCH, and at this time a time-domain length of the first transmission resource may be greater than that of each second transmission resource. For example, the first transmission resource may occupy fourteen symbols in the time domain, and each second transmission resource may occupy four symbols in the time domain. Of course, the first transmission resource and the second transmission resources may each be a transmission resource for a short PUCCH, and at this time the time-domain length of the first transmission resource may be greater than that of each second transmission resource. For example, the first transmission resource may occupy two symbols in the time domain, and each second transmission resource may occupy one symbol in the time domain.

It should be appreciated that, the at least two second transmission resources overlapping the first transmission resource in the time domain may be transmission resources for the multiple transmission of same kind of second UCI, or transmission resources corresponding to different types of second UCI respectively. For example, when the second UCI is CSI, the second transmission resources may be different transmission opportunities determined in accordance with different periodicities of CSI configurations, or two CSI transmission opportunities within a same transmission periodicity (e.g., the periodicity is relatively short). For another example, when the second UCI is an SR, the second transmission resources may be different transmission opportunities determined in accordance with different periodicities of SR configurations and each transmission opportunity corresponding to different SR configurations, or may be a plurality of SR transmission opportunities for a same SR configuration (corresponding to one periodicity) (e.g., the periodicity is relatively short). For yet another example, when the second UCI is HARQ-ACK, the second transmission resources may be different symbol positions determined in accordance with HARQ-ACK resource indication fields in different DCI.

In the embodiments of the present disclosure, prior to Step 22, the UCI transmission method may further include determining that the first UCI and the second UCI are to be transmitted simultaneously. In other words, prior to Step 22, a terminal needs to determine whether the first UCI and the second UCI are to be transmitted simultaneously. When the first UCI and the second UCI are to be transmitted simultaneously, Step 22 may be performed, and otherwise, merely the first UCI or the second UCI may be transmitted.

In a possible embodiment of the present disclosure, when each of the first UCI and the second UCI is various types of UCI, Step 22 may include Step 221 of, when the first UCI is an SR and the second UCI is HARQ-ACK, transmitting the first UCI and the second UCI simultaneously on each of the at least two second transmission resources.

In this step, the first UCI may be transmitted with a PUCCH format for carrying a small quantity of bits, for example, a PUCCH format for carrying not more than two bits, e.g., PUCCH format 0 or 1. The second UCI may be transmitted with a PUCCH format for carrying a large quantity of bits, for example, a PUCCH format for carrying more than two bits, e.g., PUCCH format 2, 3 or 4, or the second UCI may be transmitted with a PUCCH format for carrying a small quantity of bits, for example, a PUCCH format for carrying not more than two bits, e.g., PUCCH format 0 or 1.

Briefly, when the first UCI is an SR and the HARQ-ACK is transmitted on the at least two second transmission resources overlapping the first transmission resource in the time domain, the first UCI and the second UCI may be transmitted simultaneously on each of the at least two second transmission resources.

In another possible embodiment of the present disclosure, when each of the first UCI and the second UCI is various types of UCI, Step 22 may include Step 222 of, when the first UCI is CSI and the second UCI is HARQ-ACK, transmitting the first UCI and the second UCI simultaneously on each of the at least two second transmission resources.

In this step, the first UCI and the second UCI may each be transmitted with a PUCCH format for carrying a large quantity of bits, for example, a PUCCH format for carrying more than two bits, e.g., PUCCH format 2, 3 or 4. However, the PUCCH formats used for the first UCI and the second UCI may not be necessarily the same.

Briefly, when the first UCI is the CSI and the HARQ-ACK is transmitted on the at least two second transmission resources overlapping the first transmission resource in the time domain, the first UCI and the second UCI may be transmitted simultaneously on each of the at least two second transmission resources.

In yet another possible embodiment of the present disclosure, when each of the first UCI and the second UCI is various types of UCI, Step 22 may include Step 223 of, when the first UCI is a positive SR and the second UCI is HARQ-ACK, transmitting the first UCI and the second UCI simultaneously on each of the at least two second transmission resources, or transmitting the first UCI and the second UCI simultaneously on a predetermined second transmission resource of the at least two second transmission resources.

In this step, the first UCI and the second UCI may each be transmitted with a PUCCH format for carrying a small quantity of bits, for example, a PUCCH format for carrying not more than two bits, e.g., PUCCH format 0 or 1. However, the PUCCH formats used for the first UCI and the second UCI may not be necessarily the same.

In still yet another possible embodiment of the present disclosure, when each of the first UCI and the second UCI is various types of UCI, Step 22 may include Step 224 of, when the first UCI is HARQ-ACK and the second UCI is CSI, transmitting the first UCI and the second UCI simultaneously on each of the at least two second transmission resources, or transmitting the first UCI and the second UCI simultaneously on a predetermined second transmission resource of the at least two second transmission resources.

In this step, the first UCI may be transmitted with a PUCCH format for carrying a small quantity of bits, for example, a PUCCH format for carrying not more than two bits, e.g., PUCCH format 0 or 1. Further, the second UCI may be transmitted with a PUCCH format for carrying a large quantity of bits, for example, a PUCCH format for carrying more than two bits, e.g., PUCCH format 2, 3 or 4.

In still yet another possible embodiment of the present disclosure, when each of the first UCI and the second UCI is various types of UCI, Step 22 may include Step 225 of, when the first UCI is an SR and the second UCI is CSI, transmitting the first UCI and the second UCI simultaneously on each of the at least two second transmission resources, or transmitting the first UCI and the second UCI simultaneously on a predetermined second transmission resource of the at least two second transmission resources.

In this step, the first UCI may be transmitted with a PUCCH format for carrying a small quantity of bits, for example, a PUCCH format for carrying not more than two bits, e.g., PUCCH format 0 or 1. Further, the second UCI may be transmitted with a PUCCH format for carrying a large quantity of bits, for example, a PUCCH format for carrying more than two bits, e.g., PUCCH format 2, 3 or 4.

In still another possible embodiment of the present disclosure, when each of the first UCI and the second UCI is various types of UCI, Step 22 may include Step 226 of, when the first UCI is an SR, one second UCI transmitted on at least one of the at least two second transmission resources is CSI, and another second UCI transmitted on at least one of the at least two second transmission resources is HARQ-ACK, transmitting the first UCI and the second UCI simultaneously on each of the at least two second transmission resources, or transmitting the first UCI and the second UCI simultaneously on a predetermined second transmission resource of the at least two second transmission resources.

In this step, the first UCI may be transmitted with a PUCCH format for carrying a small quantity of bits, for example, a PUCCH format for carrying not more than two bits, e.g., PUCCH format 0 or 1. Further, the second UCI may be transmitted with a PUCCH format for carrying a large quantity of bits, for example, a PUCCH format for carrying more than two bits, e.g., PUCCH format 2, 3 or 4. Alternatively, the second UCI may be transmitted with a PUCCH format for carrying a small quantity of bits, for example, a PUCCH format for carrying not more than two bits, e.g., PUCCH format 0 or 1. At this time, the PUCCH formats used for the first UCI and the second UCI may not be necessarily the same.

In still another possible embodiment of the present disclosure, when each of the first UCI and the second UCI is various types of UCI, Step 22 may include Step 227 of, when the first UCI is HARQ-ACK and the second UCI is an SR or a positive SR, transmitting the first UCI and the second UCI simultaneously on each of the at least two second transmission resources, or transmitting the first UCI and the second UCI simultaneously on a predetermined second transmission resource of the at least two second transmission resources.

In this step, the first UCI and the second UCI may each be transmitted with a PUCCH format for carrying a small quantity of bits, for example, a PUCCH format for carrying not more than two bits, e.g., PUCCH format 0 or 1. However, the PUCCH formats used for the first UCI and the second UCI may not be necessarily the same.

Further, in the embodiments of the present disclosure, when the first UCI and the second UCI are transmitted by the terminal simultaneously on a predetermined second transmission resource of the at least two second transmission resources, the predetermined second transmission resource may be determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission. For example, two second UCI, e.g., the HARQ-ACK and the CSI, may be transmitted on the at least two second transmission resources, and at this time, the predetermined second transmission resource may be a transmission resource for carrying the CSI.

According to the embodiments of the present disclosure, when the first transmission resource overlaps at least two second transmission resources in the time domain, the first UCI and the second UCI may be transmitted by the terminal simultaneously on at least one of the at least two second transmission resources. As a result, it is able to provide a definite method for transmitting the UCI, thereby to enable a system to operate normally.

Figure 3:
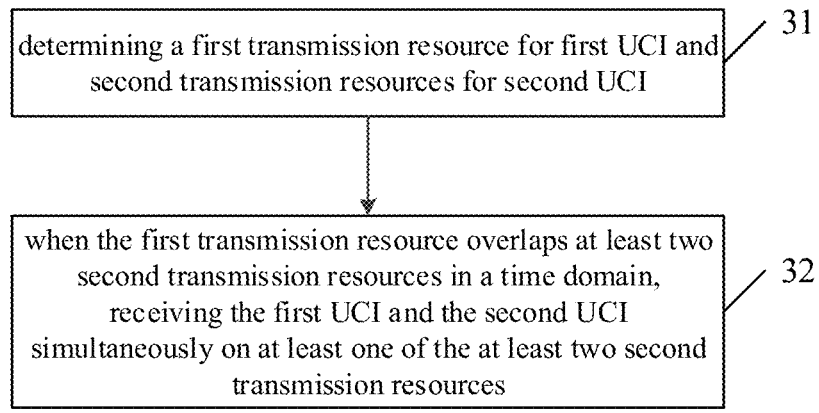
FIG. 3 is a flow chart of a UCI reception method according to one embodiment of the present disclosure.

As shown in FIG. 3, the present disclosure further provides in some embodiments a UCI reception method, which includes the following steps.

Step 31: determining a first transmission resource for first UCI and second transmission resources for second UCI.

In this step, the first UCI may be HARQ-ACK, CSI or an SR, and the second UCI may be HARQ-ACK, CSI or an SR.

Step 32: when the first transmission resource overlaps at least two second transmission resources in a time domain, receiving the first UCI and the second UCI simultaneously on at least one of the at least two second transmission resources. To be specific, Step 32 may include receiving the first UCI and the second UCI simultaneously on each of the at least two second transmission resources, or receiving the first UCI and the second UCI simultaneously on a predetermined second transmission resource of the at least two second transmission resources.

In a possible embodiment of the present disclosure, a large quantity of symbols may be occupied by the first transmission resource. For example, when the first transmission resource is a PUCCH resource, a corresponding PUCCH may be a long PUCCH occupying four to fourteen symbols. Because the first transmission resource overlaps the at least two second transmission resources in the time domain, a small quantity of symbols may be occupied by each second transmission resource. For example, when the second transmission resource is a PUCCH resource, a corresponding PUCCH may a short PUCCH occupying one or two symbols. Of course, the first transmission resource and the second transmission resources may each be a transmission resource for a long PUCCH, and at this time a time-domain length of the first transmission resource may be greater than that of each second transmission resource. For example, the first transmission resource may occupy fourteen symbols in the time domain, and each second transmission resource may occupy four symbols in the time domain. Of course, the first transmission resource and the second transmission resources may each be a transmission resource for a short PUCCH, and at this time the time-domain length of the first transmission resource may be greater than that of each second transmission resource. For example, the first transmission resource may occupy two symbols in the time domain, and each second transmission resource may occupy one symbol in the time domain.

It should be appreciated that, the at least two second transmission resources overlapping the first transmission resource in the time domain may be transmission resources for the multiple transmission of same second UCI, or transmission resources corresponding to different second UCI respectively. For example, when the second UCI is CSI, the second transmission resources may be different transmission opportunities determined in accordance with different periodicities of CSI configurations, or two CSI transmission opportunities within a same transmission periodicity (e.g., the periodicity is relatively short). For another example, when the UCI is an SR, the second transmission resources may be different transmission opportunities determined in accordance with different periodicities of SR configurations and each transmission opportunity corresponding to different SR configurations, or may be a plurality of SR transmission opportunities for a same SR configuration (corresponding to one periodicity) (e.g., the periodicity is relatively short). For yet another example, when the second UCI is HARQ-ACK, the second transmission resources may be different symbol positions determined in accordance with HARQ-ACK resource indication fields in different pieces of DCI.

In the embodiments of the present disclosure, prior to Step 32, the UCI reception method may further include determining that the first UCI and the second UCI are transmitted simultaneously. In other words, prior to Step 32, a base station needs to determine whether the first UCI and the second UCI are transmitted simultaneously. When the first UCI and the second UCI are transmitted simultaneously, Step 32 may be performed, and otherwise, merely the first UCI or the second UCI may be transmitted.

In a possible embodiment of the present disclosure, when the first UCI and the second UCI are each of various UCI types, Step 32 may include Step 321 of, when the first UCI is an SR and the second UCI is HARQ-ACK, receiving the first UCI and the second UCI simultaneously on each of the at least two second transmission resources.

In this step, the first UCI may be transmitted with a PUCCH format for carrying a small quantity of bits, for example, a PUCCH format for carrying not more than two bits, e.g., PUCCH format 0 or 1. The second UCI may be transmitted with a PUCCH format for carrying a large quantity of bits, for example, a PUCCH format for carrying more than two bits, e.g., PUCCH format 2, 3 or 4, or the second UCI may be transmitted with a PUCCH format for carrying a small quantity of bits, for example, a PUCCH format for carrying not more than two bits, e.g., PUCCH format 0 or 1.

Briefly, when the first UCI is an SR and the HARQ-ACK is transmitted on the at least two second transmission resources overlapping the first transmission resource in the time domain, the first UCI and the second UCI may be received by the base station simultaneously on each of the at least two second transmission resources.

In another possible embodiment of the present disclosure, when each of the first UCI and the second UCI is various types of UCI, Step 32 may include Step 322 of, when the first UCI is CSI and the second UCI is HARQ-ACK, receiving the first UCI and the second UCI simultaneously on each of the at least two second transmission resources.

In this step, the first UCI and the second UCI may each be transmitted with a PUCCH format for carrying a large quantity of bits, for example, a PUCCH format for carrying more than two bits, e.g., PUCCH format 2, 3 or 4. However, the PUCCH formats used for the first UCI and the second UCI may not be necessarily the same.

Briefly, when the first UCI is the CSI and the HARQ-ACK is transmitted on the at least two second transmission resources overlapping the first transmission resource in the time domain, the first UCI and the second UCI may be received by the base station simultaneously on each of the at least two second transmission resources.

In yet another possible embodiment of the present disclosure, when each of the first UCI and the second UCI is various types of UCI, Step 32 may include Step 323 of, when the first UCI is a positive SR and the second UCI is HARQ-ACK, receiving the first UCI and the second UCI simultaneously on each of the at least two second transmission resources, or receiving the first UCI and the second UCI simultaneously on a predetermined second transmission resource of the at least two second transmission resources.

In this step, the first UCI and the second UCI may each be transmitted with a PUCCH format for carrying a small quantity of bits, for example, a PUCCH format for carrying not more than two bits, e.g., PUCCH format 0 or 1. However, the PUCCH formats used for the first UCI and the second UCI may not be necessarily the same.

In still yet another possible embodiment of the present disclosure, when each of the first UCI and the second UCI is various types of UCI, Step 32 may include Step 324 of, when the first UCI is HARQ-ACK and the second UCI is CSI, receiving the first UCI and the second UCI simultaneously on each of the at least two second transmission resources, or receiving the first UCI and the second UCI simultaneously on a predetermined second transmission resource of the at least two second transmission resources.

In this step, the first UCI may be transmitted with a PUCCH format for carrying a small quantity of bits, for example, a PUCCH format for carrying not more than two bits, e.g., PUCCH format 0 or 1. Further, the second UCI may be transmitted with a PUCCH format for carrying a large quantity of bits, for example, a PUCCH format for carrying more than two bits, e.g., PUCCH format 2, 3 or 4.

In still yet another possible embodiment of the present disclosure, when each of the first UCI and the second UCI is various types of UCI, Step 32 may include Step 325 of, when the first UCI is an SR and the second UCI is CSI, receiving the first UCI and the second UCI simultaneously on each of the at least two second transmission resources, or receiving the first UCI and the second UCI simultaneously on a predetermined second transmission resource of the at least two second transmission resources.

In this step, the first UCI may be transmitted with a PUCCH format for carrying a small quantity of bits, for example, a PUCCH format for carrying not more than two bits, e.g., PUCCH format 0 or 1. Further, the second UCI may be transmitted with a PUCCH format for carrying a large quantity of bits, for example, a PUCCH format for carrying more than two bits, e.g., PUCCH format 2, 3 or 4.

In still another possible embodiment of the present disclosure, when each of the first UCI and the second UCI is various types of UCI, Step 32 may include Step 326 of, when the first UCI is an SR, one second UCI transmitted on at least one of the at least two second transmission resources is CSI, and another second UCI transmitted on at least one of the at least two second transmission resources is HARQ-ACK, receiving the first UCI and the second UCI simultaneously on each of the at least two second transmission resources, or receiving the first UCI and the second UCI simultaneously on a predetermined second transmission resource of the at least two second transmission resources.

In this step, the first UCI may be transmitted with a PUCCH format for carrying a small quantity of bits, for example, a PUCCH format for carrying not more than two bits, e.g., PUCCH format 0 or 1. Further, the second UCI may be transmitted with a PUCCH format for carrying a large quantity of bits, for example, a PUCCH format for carrying more than two bits, e.g., PUCCH format 2, 3 or 4. Alternatively, the second UCI may be transmitted with a PUCCH format for carrying a small quantity of bits, for example, a PUCCH format for carrying not more than two bits, e.g., PUCCH format 0 or 1. At this time, the PUCCH formats used for the first UCI and the second UCI may not be necessarily the same.

In still another possible embodiment of the present disclosure, when each of the first UCI and the second UCI is various types of UCI, Step 32 may include Step 327 of, when the first UCI is HARQ-ACK and the second UCI is an SR or a positive SR, receiving the first UCI and the second UCI simultaneously on each of the at least two second transmission resources, or receiving the first UCI and the second UCI simultaneously on a predetermined second transmission resource of the at least two second transmission resources.

In this step, the first UCI and the second UCI may each be transmitted with a PUCCH format for carrying a small quantity of bits, for example, a PUCCH format for carrying not more than two bits, e.g., PUCCH format 0 or 1. However, the PUCCH formats used for the first UCI and the second UCI may not be necessarily the same.

Further, in the embodiments of the present disclosure, when the first UCI and the second UCI are received by the base station simultaneously on a predetermined second transmission resource of the at least two second transmission resources, the predetermined second transmission resource may be determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission. For example, two second UCI, e.g., the HARQ-ACK and the CSI, may be transmitted on the at least two second transmission resources, and at this time, the predetermined second transmission resource may be a transmission resource for carrying the CSI.

According to the embodiments of the present disclosure, when the first transmission resource overlaps at least two second transmission resources in the time domain, the first UCI and the second UCI may be received by the base station simultaneously on at least one of the at least two second transmission resources. As a result, it is able to provide a definite method for receiving the UCI, thereby to enable a system to operate normally.

The above UCI transmission method and UCI reception method will be described hereinafter in more details in conjunction with the drawings and examples.

First Example

Figure 4:
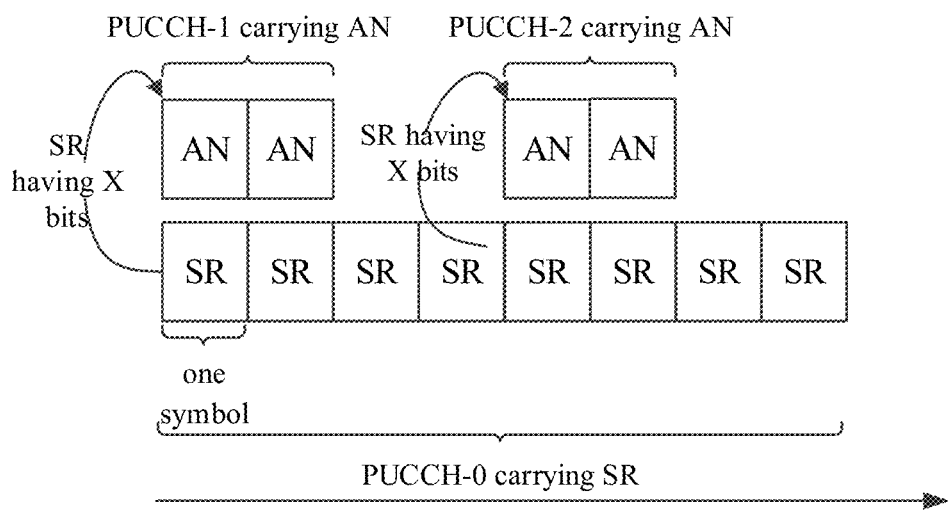
FIG. 4 is a schematic view showing a principle for the transmission and reception of UCI according to a first embodiment of the present disclosure.

As shown in FIG. 4, the first UCI is an SR, and the second UCI is HARQ-ACK. The HARQ-ACK (AN for short) may be transmitted with a PUCCH format 2, i.e., transmission resources for the HARQ-ACK may be PUCCH format 2 resources, and each PUCCH format 2 resource may occupy two symbols. The SR may be transmitted with a PUCCH format 1, i.e., a transmission resource for the SR may be a PUCCH format 1 resource, and the PUCCH format 1 resource may occupy eight symbols.

It is presumed that there are two transmission resources for the HARQ-ACK (i.e., PUCCH-1 and PUCCH-2) overlapping the transmission resource for the SR (i.e., PUCCH-0) in the time domain. At this time, it is determined that the HARQ-ACK and the SR are to be transmitted simultaneously on the transmission resource for the HARQ-ACK. For example, the SR having X bits and the HARQ-ACK may be transmitted simultaneously on the transmission resource for the HARQ-ACK after joint encoding, where K is the quantity of SR configurations overlapping each other in the time domain. In other words, no matter whether the SR is a positive SR or a negative SR, it is necessary to transmit the SR having X bits.

At this time, the terminal may transmit the SR and the HARQ-ACK on each of the two PUCCH format 2 resources (PUCCH-1 and PUCCH-2) for the HARQ-ACK in such a manner that the SR having X bits is jointly encoded with the HARQ-ACK. The HARQ-ACK transmitted on the two PUCCH format 2 resources may be different, but the SR having X bits may be the same. At this time, it is unnecessary for the terminal to transmit any PUCCH on the resource for the SR.

Based on the mode at the terminal, the base station may receive the SR having X bits and the corresponding HARQ-ACK simultaneously on each PUCCH format 2 resource for the HARQ-ACK. Even when downlink transmission for feeding back the HARQ-ACK on the PUCCH-1 has been lost by the terminal and the PUCCH-1 is not transmitted by the terminal, the SR having X bits may still be acquired in the case of parsing the PUCCH-2 by the base station. In this way, it is able to prevent the occurrence of such problems that contents transmitted on the PUCCH are understood differently by the base station and the terminal due to the loss of the downlink transmission and it is impossible to acquire the SR in time when the SR having X bits is merely transmitted on a certain PUCCH corresponding to the HARQ-ACK. For example, when the HARQ-ACK, as predefined, is merely transmitted on a certain PUCCH overlapping the SR and the PUCCH-1 is not transmitted by the terminal, the base station may understand that the a first PUCCH is PUCCH-1, consider that the SR and the HARQ-ACK are transmitted by the terminal on the PUCCH-1, and consider that merely the HARQ-ACK is transmitted on the PUCCH-2. However, the terminal may understand that the first PUCCH is PUCCH-2, and the SR and the HARQ-ACK are transmitted simultaneously on the PUCCH-2. Hence, the contents transmitted on the PUCCH-2 may be understood differently by the terminal and the base station.

Second Example

Figure 5:
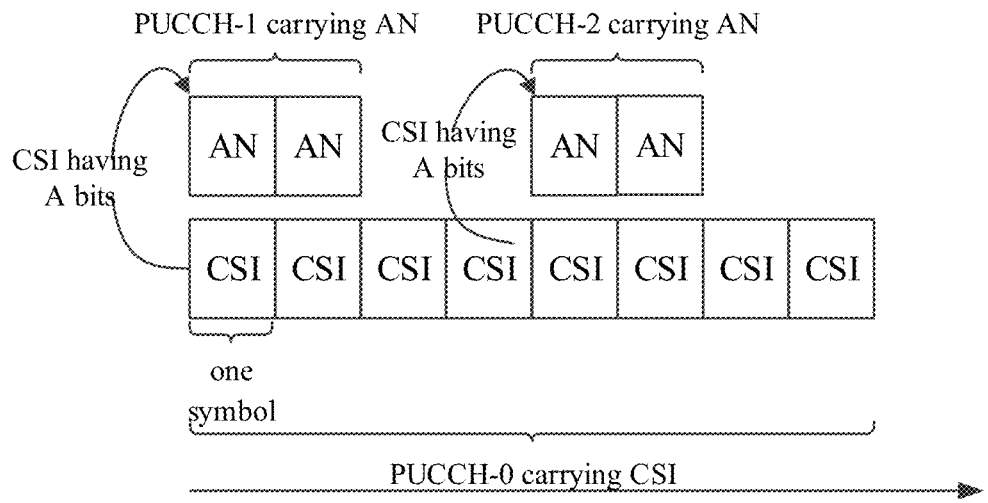
FIG. 5 is a schematic view showing a principle for the transmission and reception of the UCI according to a second embodiment of the present disclosure.

As shown in FIG. 5, the first UCI is CSI, and the second UCI is HARQ-ACK. The HARQ-ACK (AN for short) may be transmitted with a PUCCH format 2, i.e., transmission resources for the HARQ-ACK may be PUCCH format 2 resources, and each PUCCH format 2 resource may occupy two symbols. The CSI may be transmitted with a PUCCH format 3 or 4, i.e., a transmission resource for the CSI may be PUCCH format 3 or 4 resource, and the PUCCH format 3 or 4 resource may occupy eight symbols.

It is presumed that there are two transmission resources for the HARQ-ACK (i.e., PUCCH-1 and PUCCH-2) overlapping the transmission resource for the CSI (i.e., PUCCH-0) in the time domain. At this time, when it is configured through high-layer signaling that the HARQ-ACK and the CSI are supported to be transmitted simultaneously (i.e., relevant configuration parameters are true), it is determined that the HARQ-ACK and the CSI are to be transmitted simultaneously on the transmission resource for the HARQ-ACK (when it is configured through the high-layer signaling that they are not supported to be transmitted simultaneously, the CSI may be dropped directly and merely the HARQ-ACK may be transmitted). For example, the CSI and the HARQ-ACK may be transmitted simultaneously on the transmission resource for the HARQ-ACK after joint or independent encoding.

At this time, the terminal may transmit the CSI having A bits and the HARQ-ACK on each of the two PUCCH format 2 resources (PUCCH-1 and PUCCH-2) for the HARQ-ACK in the above-mentioned mode. The HARQ-ACK transmitted on the two PUCCH format 2 resources may be different, but the CSI having A bits may be the same. At this time, it is unnecessary for the terminal to transmit any PUCCH on the resource for the CSI.

Based on the mode at the terminal, the base station may receive the CSI and the corresponding HARQ-ACK simultaneously on each PUCCH format 2 resource for the HARQ-ACK. Even when downlink transmission for feeding back the HARQ-ACK on the PUCCH-1 has been lost by the terminal and the PUCCH-1 is not transmitted by the terminal, the CSI may still be acquired in the case of parsing the PUCCH-2 by the base station. In this way, it is able to prevent the occurrence of such problems that contents transmitted on the PUCCH are understood differently by the base station and the terminal due to the loss of the downlink transmission and it is impossible to acquire the CSI in time when the CSI is merely transmitted on a certain PUCCH corresponding to the HARQ-ACK.

Third Example

Figure 6:
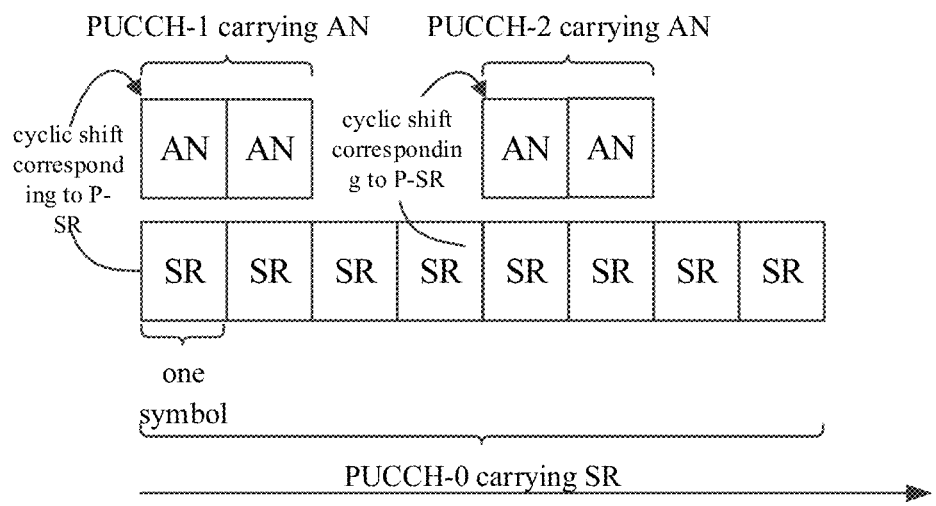
FIG. 6 is a schematic view showing a principle for the transmission and reception of the UCI according to a third embodiment of the present disclosure.
Figure 7:
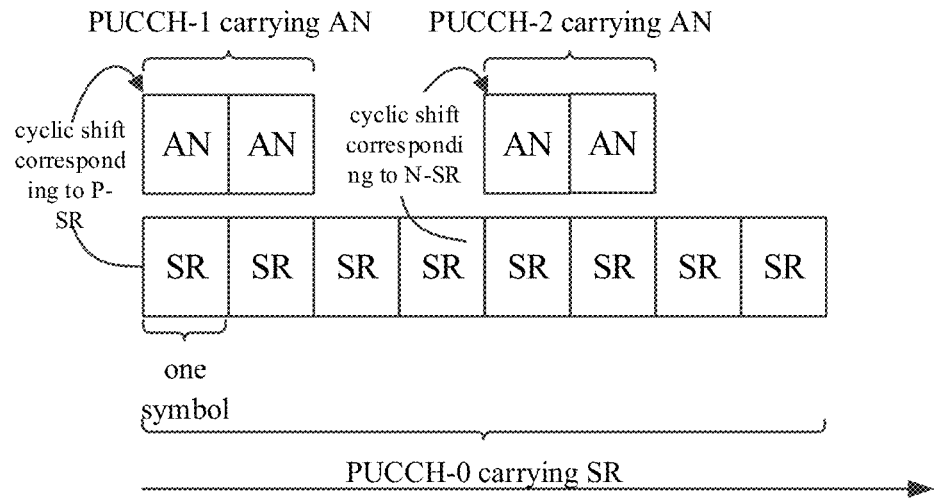
FIG. 7 is another schematic view showing a principle for the transmission and reception of the UCI according to the third embodiment of the present disclosure.

As shown in FIGS. 6 and 7, the first UCI is an SR or a positive SR, and the second UCI is HARQ-ACK. The HARQ-ACK (AN for short) may be transmitted with a PUCCH format 0, i.e., transmission resources for the HARQ-ACK may be PUCCH format 0 resources, and each PUCCH format 0 resource may occupy two symbols. The SR or the positive SR may be transmitted with a PUCCH format 1, i.e., a transmission resource for the SR may be a PUCCH format 1 resource, and the PUCCH format 1 resource may occupy eight symbols.

It is presumed that there are two transmission resources for the HARQ-ACK (i.e., PUCCH-1 and PUCCH-2) overlapping the transmission resource for the SR (i.e., PUCCH-0) in the time domain. At this time, it is determined that the HARQ-ACK and the positive SR (P-SR for short) are to be transmitted simultaneously on the transmission resource for the HARQ-ACK. For example, the HARQ-ACK may be transmitted using a cyclic shift of the corresponding positive SR on the resource for the HARQ-ACK, so as to implicitly show the coexistence of the positive SR. When the SR is a negative SR (N-SR for short), it is unnecessary to transmit the SR, and merely the HARQ-ACK needs to be transmitted. In other words, the HARQ-ACK may be transmitted using the cyclic shift of the negative SR on the resource for the HARQ-ACK.

In a first implementation mode, as shown in FIG. 6, the terminal may transmit the corresponding HARQ-ACK on each of the two PUCCH format 0 resources (PUCCH-1 and PUCCH-2) for the HARQ-ACK in the above-mentioned mode. The HARQ-ACK transmitted on the two PUCCH format 0 resources may be different, but the SR may be the same. At this time, it is unnecessary to transmit the PUCCH on the resource for the SR.

The base station may detect the HARQ-ACK in a blind manner in accordance with the cyclic shifts corresponding to the negative SR and the positive SR on each PUCCH format 0 resource for the HARQ-ACK (because the base station does not know whether the SR transmitted by the terminal is a negative SR or a positive SR, it is necessary to perform the blind detection using the cyclic shifts corresponding to both the positive SR and the negative SR), so as to determine whether the positive SR has been transmitted by the terminal in accordance with a cyclic shift corresponding to the detected HARQ-ACK. Even when downlink transmission for feeding back the HARQ-ACK on the PUCCH-1 has been lost by the terminal and the PUCCH-1 is not transmitted by the terminal, the SR may still be acquired in the case of parsing the PUCCH-2 by the base station. In this way, it is able to prevent the occurrence of such a problem that it is impossible for the base station to acquire the SR in time when the SR is merely transmitted on a certain PUCCH corresponding to the HARQ-ACK and the downlink transmission packets have been lost.

In a second implementation mode, as shown in FIG. 7, the terminal may perform the transmission on a resource selected from the two PUCCH format 0 resources (PUCCH-1 and PUCCH-2), e.g., a first one, i.e., PUCCH-1 as agreed, for the HARQ-ACK. The corresponding HARQ-ACK may be transmitted using the cyclic shift corresponding to the positive SR (P-SR for short) on the PUCCH-1 in the above-mentioned mode, and the SR may not be transmitted on the PUCCH-2. In other words, the corresponding HARQ-ACK may be transmitted using the cyclic shift corresponding to the negative SR (N-SR for short), and it is unnecessary to transmit the PUCCH on the resource for the SR.

The base station may detect the HARQ-ACK in a blind manner in accordance with the cyclic shifts corresponding to the negative SR and the positive SR on each PUCCH format 0 resource for the HARQ-ACK, so as to determine whether the positive SR has been transmitted by the terminal in accordance with a cyclic shift corresponding to the detected HARQ-ACK. Even when downlink transmission for feeding back the HARQ-ACK on the PUCCH-1 has been lost by the terminal and the PUCCH-1 is not transmitted by the terminal, the terminal may still consider that the PUCCH-2 is a first PUCCH overlapping the SR, and then transmit the corresponding HARQ-ACK using the cyclic shift corresponding to the positive SR on the PUCCH-2. The SR is transmitted implicitly, so the base station needs to detect different cyclic shifts in a blind manner. No matter whether the SR is a positive SR or a negative SR, the reception of the HARQ-ACK will not be adversely affected. In addition, when parsing the PUCCH-2, the positive SR may be acquired, so it is able to prevent the occurrence of such a problem that it is impossible for the base station to acquire the SR in time when the SR is merely transmitted on a certain PUCCH corresponding to the HARQ-ACK and the downlink transmission packets have been lost.

Fourth Example

Figure 8:
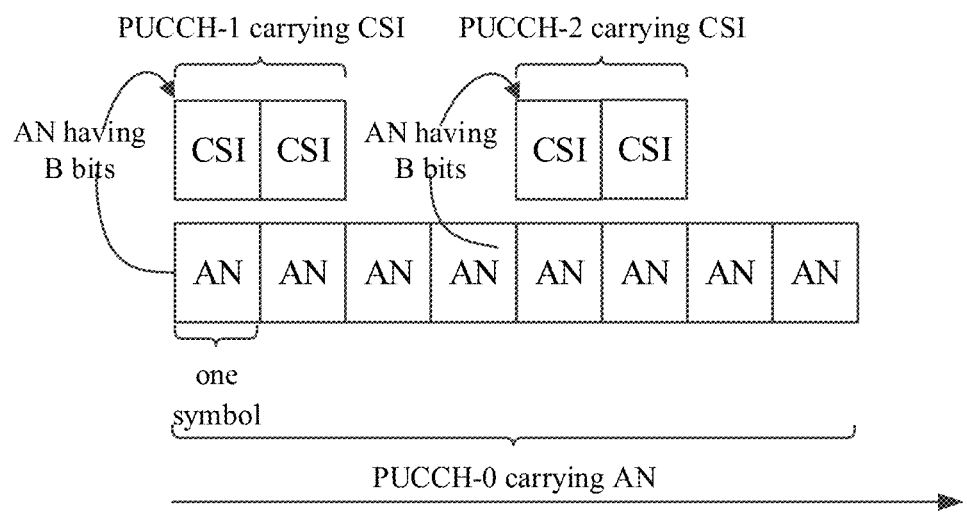
FIG. 8 is a schematic view showing a principle for the transmission and reception of the UCI according to a fourth embodiment of the present disclosure.
Figure 9:
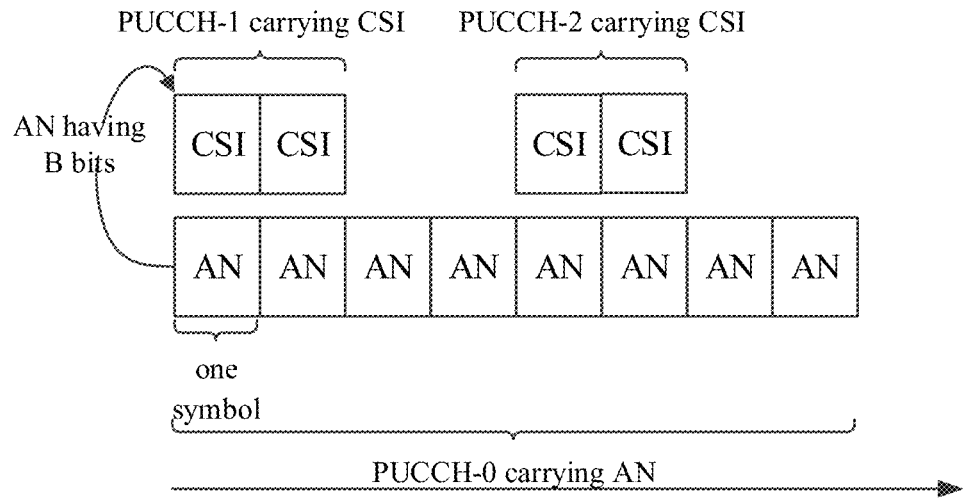
FIG. 9 is another schematic view showing a principle for the transmission and reception of the UCI according to the fourth embodiment of the present disclosure.

As shown in FIGS. 8 and 9, the first UCI is HARQ-ACK, and the second UCI is CSI. The CSI may be transmitted with a PUCCH format 2, i.e., transmission resources for the CSI may be PUCCH format 2 resources, and each PUCCH format 2 resource may occupy two symbols. The HARQ-ACK (AN for short) may be transmitted with a PUCCH format 1, i.e., a transmission resource for the HARQ-ACK may be a PUCCH format 1 resource, and the PUCCH format 1 resource may occupy eight symbols.

It is presumed that there are two transmission resources for the CSI (i.e., PUCCH-1 and PUCCH-2) overlapping the transmission resource for the HARQ-ACK (i.e., PUCCH-0) in the time domain. At this time, when it is configured through high-layer signaling that the HARQ-ACK and the CSI are supported to be transmitted simultaneously (i.e., relevant configuration parameters are true), it is determined that the HARQ-ACK having B bits and the CSI are to be transmitted simultaneously on the transmission resource for the CSI (when it is configured through the high-layer signaling that they are not supported to be transmitted simultaneously, the CSI may be dropped directly and merely the HARQ-ACK may be transmitted). For example, the CSI and the HARQ-ACK having B bits may be transmitted simultaneously on the transmission resource for the CSI after joint or independent encoding.

In a first implementation mode, as shown in FIG. 8, the terminal may transmit the HARQ-ACK and the corresponding CSI on each of the two PUCCH format 2 resources (PUCCH-1 and PUCCH-2) for the CSI in the above-mentioned mode. The CSI transmitted on the two PUCCH format 2 resources may be different, but the HARQ-ACK may be the same. At this time, it is unnecessary to transmit the PUCCH on the resource for the HARQ-ACK.

Based on the mode at the terminal, the base station may receive the HARQ-ACK and the corresponding CSI simultaneously on each PUCCH format 2 resource for the CSI. Considering that downlink transmission for feeding back the HARQ-ACK on the PUCCH-0 may probably be lost by the terminal and the HARQ-ACK is not transmitted by the terminal, the base station needs to perform blind detection on each resource for the CSI (PUCCH-1 and PUCCH-2) by presuming that there is the HARQ-ACK and there is not the HARQ-ACK. Because the base station knows the quantity of bits of the HARQ-ACK when there is the HARQ-ACK, the base station may try to perform a channel decoding operation on a received signal in accordance with the total quantities of bits of the CSI and the HARQ-ACK when it is presumed that there is the HARQ-ACK and there is not the HARQ-ACK, take a correct decoding result as an actual result, and determine whether there is the transmission of the HARQ-ACK in accordance with a detection result. In this way, it is able to determine whether the downlink transmission has been lost by the terminal, thereby to enable the base station to acquire various types of UCI in time.

In a second implementation mode, as shown in FIG. 9, the terminal may perform the transmission on a resource selected from the two PUCCH format 2 resources (PUCCH-1 and PUCCH-2), e.g., a first one, i.e., PUCCH-1 as agreed, for the CSI. The HARQ-ACK and the corresponding CSI may be transmitted simultaneously on the PUCCH-1, merely the corresponding CSI may be transmitted on the PUCCH-2, and it is unnecessary to transmit the PUCCH on the resource for the HARQ-ACK.

Based on the mode at the terminal, the base station may receive the HARQ-ACK and the corresponding CSI simultaneously on a first PUCCH format 2 resource for the CSI, and merely receive the corresponding CSI on a second PUCCH format 2 resource for the CSI. Considering that downlink transmission for feeding back the HARQ-ACK on the PUCCH-0 may probably be lost by the terminal and the HARQ-ACK is not transmitted by the terminal, the base station needs to perform blind detection on the selected resource for the CSI (PUCCH-1) by presuming that there is the HARQ-ACK and there is not the HARQ-ACK. Because the base station knows the quantity of bits of the HARQ-ACK when there is the HARQ-ACK, the base station may try to perform a channel decoding operation on a received signal in accordance with the total quantities of bits of the CSI and the HARQ-ACK when it is presumed that there is the HARQ-ACK and there is not the HARQ-ACK, take a correct decoding result as an actual result, and determine whether there is the transmission of the HARQ-ACK in accordance with a detection result. In this way, it is able to determine whether the downlink transmission has been lost by the terminal, thereby to enable the base station to acquire various types of UCI in time. As compared with the first implementation mode, in this mode, the base station merely needs to perform the blind detection on the selected CSI resource to determine whether there is the HARQ-ACK, but does not need to perform the blind detection on each CSI resource, so it is able to reduce the detection complexity, thereby to improve the transmission efficiency.

Fifth Example

Figure 10:
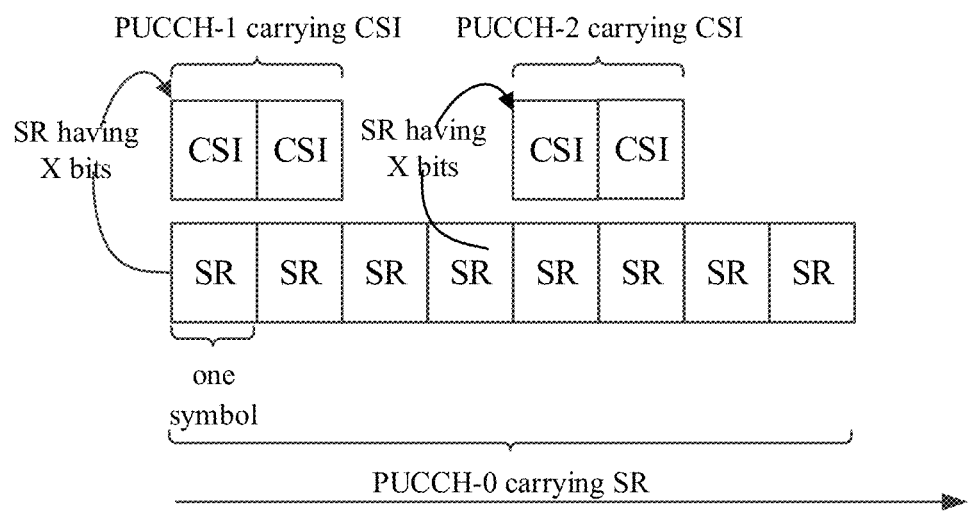
FIG. 10 is a schematic view showing a principle for the transmission and reception of the UCI according to a fifth embodiment of the present disclosure.
Figure 11:
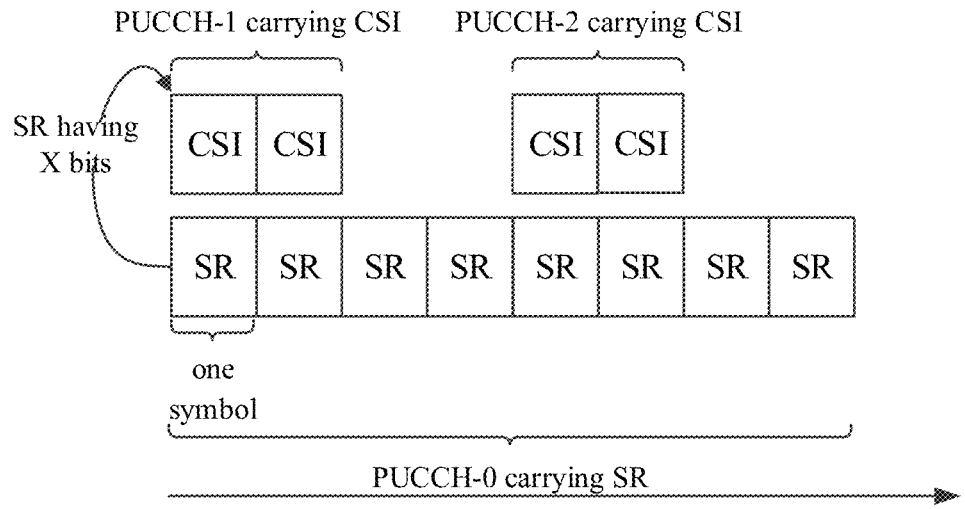
FIG. 11 is another schematic view showing a principle for the transmission and reception of the UCI according to the fifth embodiment of the present disclosure.

As shown in FIGS. 10 and 11, the first UCI is an SR, and the second UCI is CSI. The CSI may be transmitted with a PUCCH format 2, i.e., transmission resources for the CSI may be PUCCH format 2 resources, and each PUCCH format 2 resource may occupy two symbols. The SR may be transmitted with a PUCCH format 1, i.e., a transmission resource for the SR may be a PUCCH format 1 resource, and the PUCCH format 1 resource may occupy eight symbols.

It is presumed that there are two transmission resources for the CSI (i.e., PUCCH-1 and PUCCH-2) overlapping the transmission resource for the SR (i.e., PUCCH-0) in the time domain. At this time, when it is configured through high-layer signaling that the SR and the CSI are supported to be transmitted simultaneously (i.e., relevant configuration parameters are true), it is determined that the CSI and the SR are to be transmitted simultaneously on the transmission resource for the CSI. For example, the SR having X bits and the CSI may be transmitted simultaneously on the transmission resource for the CSI after joint or independent encoding. The definition of X may refer to that in the first embodiment, i.e., not matter whether the SR is a positive SR or a negative SR, the SR having X bits needs to be transmitted.

In a first implementation mode, as shown in FIG. 10, the terminal may transmit the SR having X bits and the corresponding CSI on each of the two PUCCH format 2 resources (PUCCH-1 and PUCCH-2) for the CSI. The CSI transmitted on the two PUCCH format 2 resources may be different, but the SR having X bits may be the same. At this time, it is unnecessary for the terminal to transmit the PUCCH on the resource for the SR.

Based on the mode at the terminal, the base station may receive the SR having X bits and the corresponding CSI simultaneously on each PUCCH format 2 resource for the CSI. The CSI and the SR are each periodic, so on the basis of a same agreed transmission mode as that at the terminal, the base station may always determine that there is the SR having X bits on each of the PUCCH-1 and the PUCCH-2, and at this time, it is able for the base station to acquire various types of UCI in time. Further, the SR may be received twice, so as to improve the SR transmission performance.

In a second implementation mode, as shown in FIG. 11, the terminal may perform the transmission on a resource selected from the two PUCCH format 2 resources (PUCCH-1 and PUCCH-2), e.g., a first one, i.e., PUCCH-1 as agreed, for the CSI. The SR having X bits and the corresponding CSI may be transmitted simultaneously on the PUCCH-1, merely the corresponding CSI may be transmitted on the PUCCH-2, and it is unnecessary to transmit the PUCCH on the resource for the SR.

Based on the mode at the terminal, the base station may receive the SR having X bits and the corresponding CSI simultaneously on a first PUCCH format 2 resource for the CSI, and merely receive the corresponding CSI on a second PUCCH format 2 resource for the CSI. The CSI and the SR are each periodic, so on the basis of the agreed transmission mode, the base station may always determine that there is the SR having X bits on the PUCCH-1 and there is merely the CSI on the PUCCH-2, and at this time, it is able for the base station to acquire various types of UCI in time. As compared with the first implementation mode, in this mode, no SR having X bits may be transmitted on the PUCCH-2, so it is able to reduce the transmission of redundancy bits, thereby to improve the transmission efficiency.

Sixth Example

Figure 12:
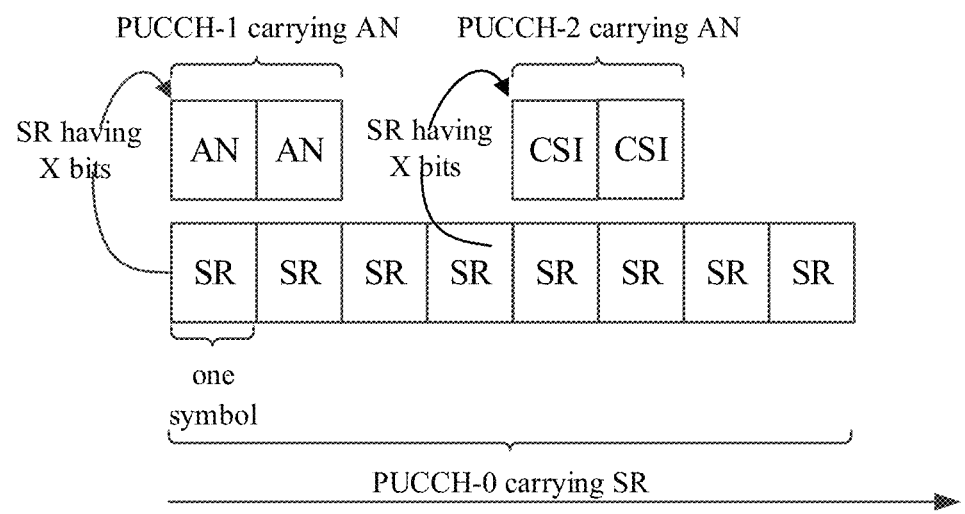
FIG. 12 is a schematic view showing a principle for the transmission and reception of the UCI according to a sixth embodiment of the present disclosure.
Figure 13:
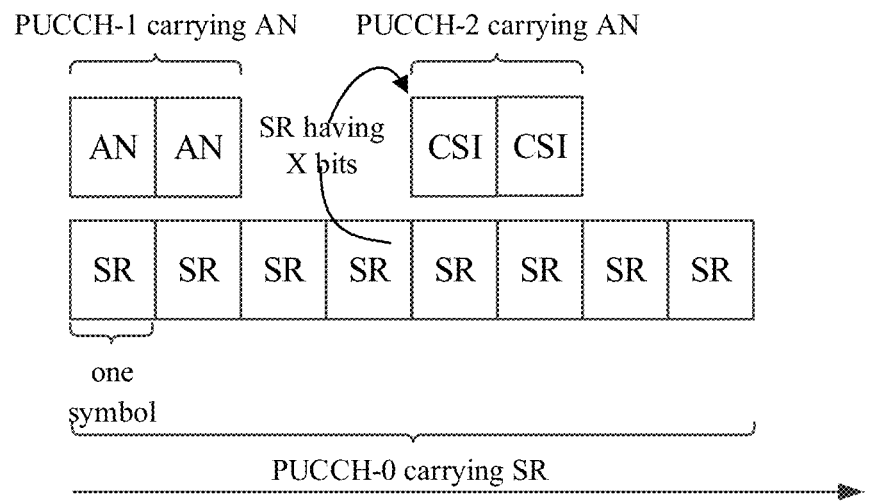
FIG. 13 is another schematic view showing a principle for the transmission and reception of the UCI according to the sixth embodiment of the present disclosure.

As shown in FIGS. 12 and 13, the first UCI is an SR, and there are two UCI, i.e., HARQ-ACK and CSI. The second UCI may be transmitted with a PUCCH format 2, i.e., transmission resources for the HARQ-ACK and the CSI may be PUCCH format 2 resources, and each PUCCH format 2 resource may occupy two symbols. The SR may be transmitted with a PUCCH format 1, i.e., a transmission resource for the SR may be a PUCCH format 1 resource, and the PUCCH format 1 resource may occupy eight symbols.

It is presumed that there are one transmission resource for the HARQ-ACK (i.e., PUCCH-1) and one transmission resource for the CSI (i.e., PUCCH-2) overlapping the transmission resource for the SR (i.e., PUCCH-0) in the time domain. At this time, it is determined that the second UCI and the SR are to be transmitted simultaneously on the transmission resources for the second UCI. For example, the SR having X bits and the HARQ-ACK may be transmitted simultaneously on the transmission resource for the HARQ-ACK after joint encoding, and the SR having X bits and the CSI may be transmitted simultaneously on the transmission resource for the CSI after joint or independent encoding. The definition of X may refer to that in the first embodiment, i.e., no matter whether the SR is a positive SR or a negative SR, the SR having X bits needs to be transmitted.

In a first implementation mode, as shown in FIG. 12, the terminal may transmit the SR having X bits and the HARQ-ACK simultaneously on the PUCCH-1, and transmit the SR having X bits and the CSI simultaneously on the PUCCH-2. It is unnecessary for the terminal to transmit the PUCCH on the resource for the SR.

Based on the mode at the terminal, the base station may receive the SR having X bits and the corresponding HARQ-ACK simultaneously on the PUCCH-1, and receive the SR having X bits and the corresponding CSI simultaneously on the PUCCH-2. The CSI and the SR are each periodic, so on the basis of the agreed transmission mode, the base station may always determine that there is the SR having X bits on each of the PUCCH-1 and the PUCCH-2. Even when downlink transmission for feeding back the HARQ-ACK on the PUCCH-1 has been lost by the terminal and the PUCCH-1 is not transmitted by the terminal, the SR having X bits may still be acquired by the base station in the case of parsing the PUCCH-2. In this way, it is able to prevent the occurrence of such problems that contents transmitted on the PUCCH are understood differently by the base station and the terminal due to the loss of the downlink transmission and it is impossible to acquire the SR in time when the SR having X bits is merely transmitted on the PUCCH corresponding to the HARQ-ACK.

In a second implementation mode, as shown in FIG. 13, the terminal may select a resource for transmitting the periodic UCI from the transmission resources (PUCCH-1 and PUCCH-2) overlapping the first transmission resource (PUCCH-0) to transmit the first UCI, i.e., transmit the SR on the PUCCH-2 carrying the CSI. Hence, merely the HARQ-ACK may be transmitted on the PUCCH-1, the SR having X bits and the CSI may be transmitted simultaneously on the PUCCH-2, and it is unnecessary to transmit the PUCCH on the resource for the SR.

Based on the mode at the terminal, the base station may receive the corresponding HARQ-ACK on the PUCCH-1, and receive the SR having X bits and the corresponding CSI simultaneously on the PUCCH-2. The CSI and the SR are each periodic, so on the basis of the agreed transmission mode, the base station may always determine that there is no SR having X bits on the PUCCH-1 and there is SR having X bits on the PUCCH-2. When downlink transmission for feeding back the HARQ-ACK on the PUCCH-1 has been lost by the terminal and the PUCCH-1 is not transmitted by the terminal, no matter whether there is the PUCCH-1, the understanding of contents transmitted on the PUCCH-2 may not be adversely affected in the case of parsing the PUCCH-2, and the base station may always acquire the SR from the transmission resource for transmitting the periodic CSI. In this way, it is able to prevent the occurrence of such problems that the contents transmitted on the PUCCH are understood differently by the base station and the terminal due to the loss of the downlink transmission and it is impossible to acquire the SR in time.

In a word, according to the embodiments of the present disclosure, when the first transmission resource overlaps at least two second transmission resources in the time domain, the first UCI and the second UCI may be transmitted or received simultaneously on at least one of the at least two second transmission resources. As a result, it is able to provide definite methods for transmitting and receiving the UCI, thereby to enable the system to operate normally.

Figure 14:
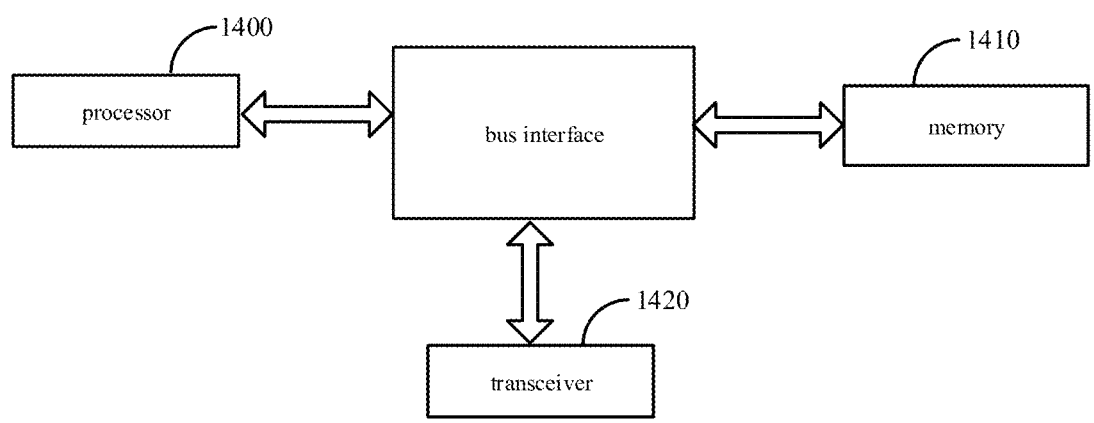
FIG. 14 is a schematic view showing a terminal and a base station according to one embodiment of the present disclosure.

As shown in FIG. 14, the present disclosure further provides in some embodiments a terminal, which includes a transceiver 1420, a memory 1410, a processor 1400, and a computer program stored in the memory 1410 and executed by the processor 1400. The processor 1400 is configured to read the computer program in the memory, so as to determine a first transmission resource for first UCI and second transmission resources for second UCI. The transceiver 1420 is configured to, when the first transmission resource overlaps at least two second transmission resources in a time domain, transmit the first UCI and the second UCI simultaneously on at least one of the at least two second transmission resources.

In a possible embodiment of the present disclosure, the processor 1400 is further configured to determine that the first UCI and the second UCI are to be transmitted simultaneously.

In a possible embodiment of the present disclosure, the first UCI may be HARQ-ACK, CSI or an SR, and the second UCI may be HARQ-ACK, CSI or an SR.

In a possible embodiment of the present disclosure, the transceiver 1420 is further configured to: transmit the first UCI and the second UCI simultaneously on each of the at least two second transmission resources; or transmit the first UCI and the second UCI simultaneously on a predetermined second transmission resource of the at least two second transmission resources.

In a possible embodiment of the present disclosure, the transceiver 1420 is further configured to, when the first UCI is an SR or CSI and the second UCI is HARQ-ACK, transmit the first UCI and the second UCI simultaneously on each of the at least two second transmission resources.

In a possible embodiment of the present disclosure, the transceiver 1420 is further configured to, when the first UCI is a positive SR and the second UCI is HARQ-ACK, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transceiver 1420 is further configured to, when the first UCI is HARQ-ACK or an SR and the second UCI is CSI, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transceiver 1420 is further configured to, when the first UCI is an SR, one second UCI transmitted on at least one of the at least two second transmission resources is CSI, and another second UCI transmitted on at least one of the at least two second transmission resources is HARQ-ACK, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transceiver 1420 is further configured to, when the first UCI is HARQ-ACK and the second UCI is an SR or a positive SR, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the first UCI may be transmitted with a PUCCH format for carrying a small quantity of bits.

In a possible embodiment of the present disclosure, the first UCI may be transmitted with a PUCCH format for carrying a large quantity of bits.

In a possible embodiment of the present disclosure, the second UCI may be transmitted with a PUCCH format for carrying a small quantity of bits.

In a possible embodiment of the present disclosure, the second UCI may be transmitted with a PUCCH format for carrying a large quantity of bits.

In a possible embodiment of the present disclosure, the predetermined second transmission resource may be determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission.

In a word, according to the embodiments of the present disclosure, when the first transmission resource overlaps at least two second transmission resources in the time domain, the first UCI and the second UCI may be transmitted simultaneously on at least one of the at least two second transmission resources. As a result, it is able to provide a definite method for transmitting the UCI, thereby to enable a system to operate normally.

It should be appreciated that, the terminal in the embodiments of the present disclosure is capable of implementing the above-mentioned UCI transmission method, and the implementation of the terminal may refer to that of the UCI transmission method mentioned hereinabove with a same or similar beneficial effect.

Figure 15:
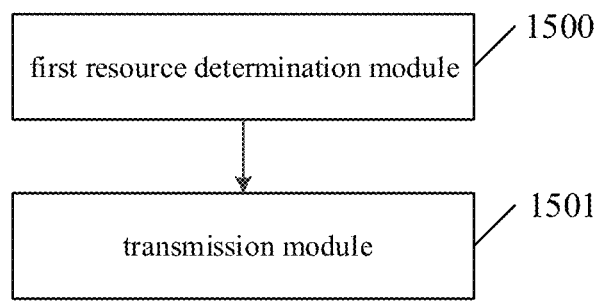
FIG. 15 is a schematic view showing a UCI transmission device according to one embodiment of the present disclosure.

As shown in FIG. 15, the present disclosure further provides in some embodiments a UCI transmission device, which includes: a first resource determination module 1500 configured to determine a first transmission resource for first UCI and second transmission resources for second UCI; and a transmission module 1501 configured to, when the first transmission resource overlaps at least two second transmission resources in a time domain, transmit the first UCI and the second UCI simultaneously on at least one of the at least two second transmission resources.

In a possible embodiment of the present disclosure, the UCI transmission device may further include a first determination module configured to determine that the first UCI and the second UCI are to be transmitted simultaneously.

In a possible embodiment of the present disclosure, the first UCI may be HARQ-ACK, CSI or an SR, and the second UCI may be HARQ-ACK, CSI or an SR.

In a possible embodiment of the present disclosure, the transmission module is further configured to, transmit the first UCI and the second UCI simultaneously on each of the at least two second transmission resources; or transmit the first UCI and the second UCI simultaneously on a predetermined second transmission resource of the at least two second transmission resources.

In a possible embodiment of the present disclosure, the transmission module may include a first transmission sub-module configured to, when the first UCI is an SR or CSI and the second UCI is HARQ-ACK, transmit the first UCI and the second UCI simultaneously on each of the at least two second transmission resources.

In a possible embodiment of the present disclosure, the transmission module may include a second transmission sub-module configured to, when the first UCI is a positive SR and the second UCI is HARQ-ACK, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transmission module may include a third transmission sub-module configured to, when the first UCI is HARQ-ACK or an SR and the second UCI is CSI, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transmission module may include a fourth transmission sub-module configured to, when the first UCI is an SR, one piece of second UCI transmitted on at least one of the at least two second transmission resources is CSI, and another piece of second UCI transmitted on at least one of the at least two second transmission resources is HARQ-ACK, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the transmission module may include a fifth transmission sub-module configured to, when the first UCI is HARQ-ACK and the second UCI is an SR or a positive SR, transmit the first UCI and the second UCI simultaneously on each of the at least two second transmission resources, or transmit the first UCI and the second UCI simultaneously on a predetermined second transmission resource of the at least two second transmission resources.

In a possible embodiment of the present disclosure, the first UCI may be transmitted with a PUCCH format for carrying a small quantity of bits.

In a possible embodiment of the present disclosure, the first UCI may be transmitted with a PUCCH format for carrying a large quantity of bits.

In a possible embodiment of the present disclosure, the second UCI may be transmitted with a PUCCH format for carrying a small quantity of bits.

In a possible embodiment of the present disclosure, the second UCI may be transmitted with a PUCCH format for carrying a large quantity of bits.

In a possible embodiment of the present disclosure, the predetermined second transmission resource may be determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission.

In a word, according to the embodiments of the present disclosure, when the first transmission resource overlaps at least two second transmission resources in the time domain, the first UCI and the second UCI may be transmitted simultaneously on at least one of the at least two second transmission resources. As a result, it is able to provide a definite method for transmitting the UCI, thereby to enable a system to operate normally.

It should be appreciated that, the UCI transmission device in the embodiments of the present disclosure is capable of implementing the above-mentioned UCI transmission method, and the implementation of the UCI transmission device may refer to that of the UCI transmission method mentioned hereinabove with a same or similar beneficial effect.

The present disclosure further provides in some embodiments a computer-readable storage medium storing therein a computer program. The computer program is executed by a processor so as to implement the above-mentioned UCI transmission method with a same technical effect, which will not be particularly defined herein. The computer-readable storage medium may be a Read-Only Memory (ROM), a Random Access Memory (RAM), a magnetic disk or an optical disk.

As shown in FIG. 14, the present disclosure further provides in some embodiments a base station, which includes a transceiver 1420, a memory 1410, a processor 1400, and a computer program stored in the memory 1410 and executed by the processor 1400. The processor 1400 is configured to read the computer program in the memory 1410 so as to determine a first transmission resource for first UCI and second transmission resources for second UCI, and the transceiver 1420 is configured to, when the first transmission resource overlaps at least two second transmission resources in a time domain, receive the first UCI and the second UCI simultaneously on at least one of the at least two second transmission resources.

In a possible embodiment of the present disclosure, the processor 1400 is further configured to determine that the first UCI and the second UCI are transmitted simultaneously.

In a possible embodiment of the present disclosure, the first UCI may be HARQ-ACK, CSI or an SR, and the second UCI may be HARQ-ACK, CSI or an SR.

In a possible embodiment of the present disclosure, the transceiver 1420 is further configured to: receive the first UCI and the second UCI simultaneously on each of the at least two second transmission resources; or receive the first UCI and the second UCI simultaneously on a predetermined second transmission resource of the at least two second transmission resources.

In a possible embodiment of the present disclosure, the transceiver 1420 is further configured to, when the first UCI is an SR or CSI and the second UCI is HARQ-ACK, receive the first UCI and the second UCI simultaneously on each of the at least two second transmission resources.

In a possible embodiment of the present disclosure, the transceiver 1420 is further configured to, when the first UCI is a positive SR and the second UCI is HARQ-ACK, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the transceiver 1420 is further configured to, when the first UCI is HARQ-ACK or an SR and the second UCI is CSI, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the transceiver 1420 is further configured to, when the first UCI is an SR, one second UCI transmitted on at least one of the at least two second transmission resources is CSI, and another second UCI transmitted on at least one of the at least two second transmission resources is HARQ-ACK, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the transceiver 1420 is further configured to, when the first UCI is HARQ-ACK and the second UCI is an SR or a positive SR, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the first UCI may be transmitted with a PUCCH format for carrying a small quantity of bits.

In a possible embodiment of the present disclosure, the first UCI may be transmitted with a PUCCH format for carrying a large quantity of bits.

In a possible embodiment of the present disclosure, the second UCI may be transmitted with a PUCCH format for carrying a small quantity of bits.

In a possible embodiment of the present disclosure, the second UCI may be transmitted with a PUCCH format for carrying a large quantity of bits.

In a possible embodiment of the present disclosure, the predetermined second transmission resource may be determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission.

In a word, according to the embodiments of the present disclosure, when the first transmission resource overlaps at least two second transmission resources in the time domain, the first UCI and the second UCI may be received by the base station simultaneously on at least one of the at least two second transmission resources. As a result, it is able to provide a definite method for receiving the UCI, thereby to enable a system to operate normally.

It should be appreciated that, the base station in the embodiments of the present disclosure is capable of implementing the above-mentioned UCI reception method, and the implementation of the base station may refer to that of the UCI reception method mentioned hereinabove with a same or similar beneficial effect.

Figure 16:
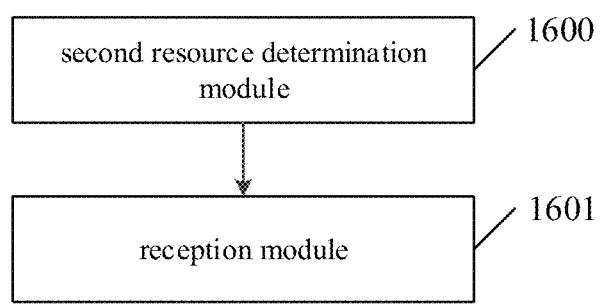
FIG. 16 is a schematic view showing a UCI reception device according to one embodiment of the present disclosure.

As shown in FIG. 16, the present disclosure further provides in some embodiments a UCI reception device, which includes: a second resource determination module 1600 configured to determine a first transmission resource for first UCI and second transmission resources for second UCI; and a reception module 1601 configured to, when the first transmission resource overlaps at least two second transmission resources in a time domain, receive the first UCI and the second UCI simultaneously on at least one of the at least two second transmission resources.

In a possible embodiment of the present disclosure, the UCI reception device may further include a second determination module configured to determine that the first UCI and the second UCI are transmitted simultaneously.

In a possible embodiment of the present disclosure, the first UCI may be HARQ-ACK, CSI or an SR, and the second UCI may be HARQ-ACK, CSI or an SR.

In a possible embodiment of the present disclosure, the reception module is further configured to: receive the first UCI and the second UCI simultaneously on each of the at least two second transmission resources; or receive the first UCI and the second UCI simultaneously on a predetermined second transmission resource of the at least two second transmission resources.

In a possible embodiment of the present disclosure, the reception module may include a first reception sub-module configured to, when the first UCI is an SR or CSI and the second UCI is HARQ-ACK, receive the first UCI and the second UCI simultaneously on each of the at least two second transmission resources.

In a possible embodiment of the present disclosure, the reception module may include a second reception sub-module configured to, when the first UCI is a positive SR and the second UCI is HARQ-ACK, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the reception module may include a third reception sub-module configured to, when the first UCI is HARQ-ACK or an SR and the second UCI is CSI, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the reception module may include a fourth reception sub-module configured to, when the first UCI is an SR, one piece of second UCI transmitted on at least one of the at least two second transmission resources is CSI, and another piece of second UCI transmitted on at least one of the at least two second transmission resources is HARQ-ACK, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the reception module may include a fifth reception sub-module configured to, when the first UCI is HARQ-ACK and the second UCI is an SR or a positive SR, receive the first UCI and the second UCI simultaneously on each of the at least two second transmission resources, or receive the first UCI and the second UCI simultaneously on a predetermined second transmission resource of the at least two second transmission resources.

In a possible embodiment of the present disclosure, the first UCI may be transmitted with a PUCCH format for carrying a small quantity of bits.

In a possible embodiment of the present disclosure, the first UCI may be transmitted with a PUCCH format for carrying a large quantity of bits.

In a possible embodiment of the present disclosure, the second UCI may be transmitted with a PUCCH format for carrying a small quantity of bits.

In a possible embodiment of the present disclosure, the second UCI may be transmitted with a PUCCH format for carrying a large quantity of bits.

In a possible embodiment of the present disclosure, the predetermined second transmission resource may be determined in at least one of the following ways: the predetermined second transmission resource is a first second transmission resource of the at least two second transmission resources; the predetermined second transmission resource is a last second transmission resource of the at least two second transmission resources; and the predetermined second transmission resource is second transmission resource of the at least two second transmission resources for a second UCI with periodic transmission.

In a word, according to the embodiments of the present disclosure, when the first transmission resource overlaps at least two second transmission resources in the time domain, the first UCI and the second UCI may be received by the base station simultaneously on at least one of the at least two second transmission resources. As a result, it is able to provide a definite method for receiving the UCI, thereby to enable a system to operate normally.

It should be appreciated that, the UCI reception device in the embodiments of the present disclosure is capable of implementing the above-mentioned UCI reception method, and the implementation of the UCI reception device may refer to that of the UCI reception method mentioned hereinabove with a same or similar beneficial effect.

The present disclosure further provides in some embodiments a computer-readable storage medium storing therein a computer program. The computer program is executed by a processor so as to implement the above-mentioned UCI reception method with a same technical effect, which will not be particularly defined herein. The computer-readable storage medium may be an ROM, an RAM, a magnetic disk or an optical disk.

Such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The description has been given hereinabove in conjunction with the drawings and the embodiments, but the present disclosure shall not be limited to the above preferred embodiments. These embodiments are for illustrative purposes only, but shall not be used to limit the scope of the present disclosure. A person skilled in the art may make various alternations or modifications without departing from the spirit of the present disclosure and the scope defined in the appended claims, which also fall within the scope of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An Uplink Control Information (UCI) transmission method, comprising:
    determining a first transmission PUCCH resource for first UCI and at least a second transmission PUCCH resource for second UCI and at least a third transmission PUCCH resource for the second UCI; and
    transmitting, when the first transmission PUCCH resource overlaps with both the second transmission PUCCH resource and the third transmission PUCCH resource in a time domain, the first UCI and the second UCI simultaneously on at least one of the second transmission PUCCH resource and the third transmission PUCCH resource.

2. The UCI transmission method according to claim 1, wherein the transmitting the first UCI and the second UCI simultaneously on the at least one of the second transmission PUCCH resource and the third transmission PUCCH resource comprises:

transmitting the first UCI and the second UCI simultaneously on each of the second transmission PUCCH resource and the third transmission PUCCH resource; or transmitting the first UCI and the second UCI simultaneously on a predetermined second transmission PUCCH resource of the second transmission PUCCH resource and the third transmission PUCCH resource.

3. The UCI transmission method according to claim 2, wherein the transmitting the first UCI and the second UCI simultaneously on the at least one of the second transmission PUCCH resource and the third transmission PUCCH resource comprises at least one of:

method 1 of, when the first UCI is an SR or CSI and the second UCI is HARQ-ACK, transmitting the first UCI and the second UCI simultaneously on each of the second transmission PUCCH resource and the third transmission PUCCH resource;

method 2 of, when the first UCI is a positive SR and the second UCI is HARQ-ACK, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource;

method 3 of, when the first UCI is HARQ-ACK or an SR and the second UCI is CSI, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource;

method 4 of, when the first UCI is an SR, one second UCI transmitted on at least one of the second transmission PUCCH resource and the third transmission PUCCH resource is CSI, and another second UCI transmitted on at least one of the second transmission PUCCH resource and the third transmission PUCCH resource is HARQ-ACK, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource; and method 5 of, when the first UCI is HARQ-ACK and the second UCI is an SR or a positive SR, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource.

4. The UCI transmission method according to claim 3, wherein the first UCI is transmitted with a PUCCH format for carrying a small quantity of bits; or the first UCI is transmitted with a PUCCH format for carrying a large quantity of bits when the method 1 is adopted; and/or the second UCI is transmitted with a PUCCH format for carrying a small quantity of bits when any one of the methods 1, 2, 4 and 5 is adopted; or the second UCI is transmitted with a PUCCH format for carrying a large quantity of bits when any of the methods 1, 3 and 4 is adopted.

5. The UCI transmission method according to claim 2, wherein the predetermined transmission PUCCH resource is determined in at least one of the following ways:

the predetermined transmission PUCCH resource is a first transmission PUCCH resource of the second transmission PUCCH resource and the third transmission PUCCH resource;

the predetermined transmission PUCCH resource is a last transmission PUCCH resource of the second transmission PUCCH resource and the third transmission PUCCH resource; and the predetermined transmission PUCCH resource is a transmission PUCCH resource of the transmission PUCCH resource and the third transmission PUCCH resource for a second UCI with periodic transmission.

6. A UCI reception method, comprising:

determining a first transmission PUCCH resource for first UCI and at least a second transmission PUCCH resource for second UCI and at least a third transmission PUCCH resource for the second UCI with respect to UCI transmitted by a terminal; and receiving, when the first transmission PUCCH resource overlaps with both the second transmission PUCCH resource and the third transmission PUCCH resource in a time domain, the first UCI and the second UCI simultaneously on at least one of the transmission PUCCH resource and the third transmission PUCCH resource.

7. The UCI reception method according to claim 6, wherein the receiving the first UCI and the second UCI simultaneously on the at least one of the transmission PUCCH resource and the third transmission PUCCH resource comprises:

receiving the first UCI and the second UCI simultaneously on each of the transmission PUCCH resource and the third transmission PUCCH resource; or receiving the first UCI and the second UCI simultaneously on a predetermined transmission PUCCH resource of the at least the transmission PUCCH resource and the third transmission PUCCH resource.

8. The UCI reception method according to claim 7, wherein the receiving the first UCI and the second UCI simultaneously on the at least one of the second transmission PUCCH resource and the third transmission PUCCH resource comprises at least one of:

method a of, when the first UCI is an SR or CSI and the second UCI is HARQ-ACK, receiving the first UCI and the second UCI simultaneously on each of the transmission PUCCH resource and the third transmission PUCCH resource;

method b of, when the first UCI is a positive SR and the second UCI is HARQ-ACK, receiving the first UCI and the second UCI simultaneously on each of the transmission PUCCH resource and the third transmission PUCCH resource, or receiving the first UCI and the second UCI simultaneously on a predetermined transmission PUCCH resource of the transmission PUCCH resource and the third transmission PUCCH resource;

method c of, when the first UCI is HARQ-ACK or an SR and the second UCI is CSI, receiving the first UCI and the second UCI simultaneously on each of the transmission PUCCH resource and the third transmission PUCCH resource, or receiving the first UCI and the second UCI simultaneously on a predetermined transmission PUCCH resource of the transmission PUCCH resource and the third transmission PUCCH resource;

method d of, when the first UCI is an SR, one second UCI transmitted on at least one of the transmission PUCCH resource and the third transmission PUCCH resource is CSI, and another second UCI transmitted on at least one of the transmission PUCCH resource and the third transmission PUCCH resource is HARQ-ACK, receiving the first UCI and the second UCI simultaneously on each of the second transmission PUCCH resource and the third transmission PUCCH resource, or receiving the first UCI and the second UCI simultaneously on a predetermined transmission PUCCH resource of the transmission PUCCH resource and the third transmission PUCCH resource; and method e of, when the first UCI is HARQ-ACK and the second UCI is an SR or a positive SR, receiving the first UCI and the second UCI simultaneously on each of the transmission PUCCH resource and the third transmission PUCCH resource, or receiving the first UCI and the second UCI simultaneously on a predetermined transmission PUCCH resource of the second transmission PUCCH resource and the third transmission PUCCH resource.

9. The UCI reception method according to claim 8, wherein
the first UCI is transmitted with a PUCCH format for carrying a small quantity of bits; or
the first UCI is transmitted with a PUCCH format for carrying a large quantity of bits when the method a is adopted; and/or
the second UCI is transmitted with a PUCCH format for carrying a small quantity of bits when any one of the methods a, b, d and e is adopted; or
the second UCI is transmitted with a PUCCH format for carrying a large quantity of bits when any of the methods a, c and d is adopted.

10. The UCI reception method according to claim 7, wherein the predetermined transmission PUCCH resource is determined in at least one of the following ways:
the predetermined transmission PUCCH resource is a first transmission PUCCH resource of the second transmission PUCCH resource and the third transmission PUCCH resource;
the predetermined transmission PUCCH resource is a last transmission PUCCH resource of the second transmission PUCCH resource and the third transmission PUCCH resource; and
the predetermined transmission PUCCH resource is a transmission PUCCH resource of the second transmission PUCCH resource and the third transmission PUCCH resource for a second UCI with periodic transmission.

11. A terminal, comprising a transceiver, a memory, a processor, and a computer program stored in the memory and executed by the processor, wherein the processor is configured to read the computer program so as to determine a first transmission PUCCH resource for first UCI and a transmission PUCCH resource for second UCI and a third transmission PUCCH resource for the second UCI, and the transceiver is configured to, when the first transmission PUCCH resource overlaps both the second transmission PUCCH resource and the third transmission PUCCH resource in a time domain, transmit the first UCI and the second UCI simultaneously on at least one of the two second transmission PUCCH resources and the third transmission PUCCH resource.

12. The terminal according to claim 11, wherein the terminal is further configured to: transmit the first UCI and the second UCI simultaneously on each of the second transmission PUCCH resource and the third transmission PUCCH resource; or transmit the first UCI and the second UCI simultaneously on a predetermined transmission PUCCH resource of the second transmission PUCCH resource and the third transmission PUCCH resource.

13. The terminal according to claim 12, wherein the terminal is further configured to perform at least one of:
configuration 1 of, when the first UCI is an SR or CSI and the second UCI is HARQ-ACK, transmit the first UCI and the second UCI simultaneously on each of the second transmission PUCCH resource and the third transmission PUCCH resource;
configuration 2 of, when the first UCI is a positive SR and the second UCI is HARQ-ACK, transmitting the first UCI and the second UCI simultaneously on each of the second transmission PUCCH resource and the third transmission PUCCH resource, or transmitting the first UCI and the second UCI simultaneously on a predetermined transmission PUCCH resource of the two second transmission PUCCH resource and the third transmission PUCCH resource;
configuration 3 of, when the first UCI is HARQ-ACK or an SR and the second UCI is CSI, transmitting the first UCI and the second UCI simultaneously on each of the second transmission PUCCH resource and the third transmission PUCCH resource, or transmitting the first UCI and the second UCI simultaneously on a predetermined transmission PUCCH resource of the two second transmission PUCCH resource and the third transmission PUCCH resource;
configuration 4 of, when the first UCI is an SR, one second UCI transmitted on at least one of the second transmission PUCCH resource and the third transmission PUCCH resource is CSI, and another second UCI transmitted on at least one of the second transmission PUCCH resource and the third transmission PUCCH resource is HARQ-ACK, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource; and
configuration 5 of, when the first UCI is HARQ-ACK and the second UCI is an SR or a positive SR, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource.

14. The terminal according to claim 13, wherein
the first UCI is transmitted with a PUCCH format for carrying a small quantity of bits; or
the first UCI is transmitted with a PUCCH format for carrying a large quantity of bits when the configuration 1 is adopted; and/or the second UCI is transmitted with a PUCCH format for carrying a small quantity of bits when any one of the configurations 1, 2, 4 and 5 is adopted; or the second UCI is transmitted with a PUCCH format for carrying a large quantity of bits when any of the configurations 1, 3 and 4 is adopted.

15. The terminal according to claim 12, wherein the predetermined transmission PUCCH resource is determined in at least one of the following ways:

the predetermined transmission PUCCH resource is a first transmission PUCCH resource of the second transmission PUCCH resource and the third transmission PUCCH resource;

the predetermined transmission PUCCH resource is a last transmission PUCCH resource of the second transmission PUCCH resource and the third transmission PUCCH resource; and the predetermined transmission PUCCH resource is a transmission PUCCH resource of the second transmission PUCCH resource and the third transmission PUCCH resource for a second UCI with periodic transmission.

16. A base station, comprising a transceiver, a memory, a processor, and a computer program stored in the memory and executed by the processor, wherein the processor is configured to read the computer program in the memory, so as to implement the UCI transmission method according to claim 1.

17. The base station according to claim 16, wherein the base station is further configured to: receive the first UCI and the second UCI simultaneously on each of the transmission PUCCH resource and the third transmission PUCCH resource; or receive the first UCI and the second UCI simultaneously on a predetermined transmission PUCCH resource of the second transmission PUCCH resource and the third transmission PUCCH resource.

18. The base station according to claim 17, wherein the base station is further configured to perform at least one of:

configuration a of, when the first UCI is an SR or CSI and the second UCI is HARQ-ACK, transmitting the first UCI and the second UCI simultaneously on each of the second transmission PUCCH resource and the third transmission PUCCH resource;

configuration b of, when the first UCI is a positive SR and the second UCI is HARQ-ACK, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource;

configuration c of, when the first UCI is HARQ-ACK or an SR and the second UCI is CSI, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource;

configuration d of, when the first UCI is an SR, one second UCI transmitted on at least one of the second transmission PUCCH resource and the third transmission PUCCH resource is CSI, and another second UCI transmitted on at least one of the second transmission PUCCH resource and the third transmission PUCCH resource is HARQ-ACK, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource; and configuration e of, when the first UCI is HARQ-ACK and the second UCI is an SR or a positive SR, transmitting the first UCI and the second UCI simultaneously on each of the second transmission PUCCH resource and the third transmission PUCCH resource, or transmitting the first UCI and the second UCI simultaneously on a predetermined transmission PUCCH resource of the second transmission PUCCH resource and the third transmission PUCCH resource.

19. The base station according to claim 18, wherein the first UCI is transmitted with a PUCCH format for carrying a small quantity of bits; or the first UCI is transmitted with a PUCCH format for carrying a large quantity of bits when the configuration a is adopted; and/or the second UCI is transmitted with a PUCCH format for carrying a small quantity of bits when any one of the configurations a, b, d and e is adopted; or the second UCI is transmitted with a PUCCH format for carrying a large quantity of bits when any of the configurations a, c and d is adopted.

20. The base station according to claim 17, wherein the predetermined transmission PUCCH resource is determined in at least one of the following ways:

the predetermined transmission PUCCH resource is a first transmission PUCCH resource of the second transmission PUCCH resource and the third transmission PUCCH resource;

the predetermined transmission PUCCH resource is a last transmission PUCCH resource of the second transmission PUCCH resource and the third transmission PUCCH resource; and the predetermined transmission PUCCH resource is a transmission PUCCH resource of the second transmission PUCCH resource and the third transmission PUCCH resource for a second UCI with periodic transmission.

\* \* \* \* \*